(12) United States Patent
Oat et al.

(10) Patent No.: US 8,810,590 B2
(45) Date of Patent: Aug. 19, 2014

(54) METHOD AND APPARATUS FOR SPATIAL BINNING ON A GPU AND GLOBAL PATH PLANNING TO AVOID SPATIALLY BINNED OBJECTS

(75) Inventors: Christopher Oat, Cambridge, MA (US); Shopf Jeremy, Stewartstown, PA (US); Joshua D. Barczak, Timonium, MD (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1171 days.

(21) Appl. No.: 12/501,374

(22) Filed: Jul. 10, 2009

(65) Prior Publication Data

US 2010/0141666 A1 Jun. 10, 2010

Related U.S. Application Data

(60) Provisional application No. 61/079,917, filed on Jul. 11, 2008, provisional application No. 61/079,920, filed on Jul. 11, 2008, provisional application No. 61/161,539, filed on Mar. 19, 2009.

(51) Int. Cl.
*G06T 11/40* (2006.01)
*G06T 1/60* (2006.01)
*G06F 12/02* (2006.01)

(52) U.S. Cl.
USPC .......................... 345/552; 345/530; 345/544

(58) Field of Classification Search
USPC ................... 345/426, 530, 544, 552
See application file for complete search history.

(56) References Cited

U.S. PATENT DOCUMENTS

| 6,347,344 | B1 * | 2/2002 | Baker et al. ..................... 710/20 |
| 6,509,902 | B1 * | 1/2003 | Pfister et al. .................. 345/582 |
| 6,924,808 | B2 * | 8/2005 | Kurihara et al. ............. 345/506 |
| 7,710,417 | B2 * | 5/2010 | Ramshaw ..................... 345/422 |

OTHER PUBLICATIONS

Akenine-Möeller, T., Haines, E. and Hoffman, N. 2008. Real-Time Rendering. 3rd ed. A.K. Peters, Ltd. http://www.realtimerendering.com/.
AMD GPUMesh Mapper. 2008. http://developer.amd.com/gpu/MeshMapper/Pages/default.aspx.
Anada, T., Imura, M., Yoshihiro Yasumuro, Y.M., Chihara, K. Particle-Based Fluid Simulation on GPU. In ACM Workshop on General-Purpose Computing on Graphics Processors, 2004, ACM, New York, NY, USA.
Annen, T., Kautz, J., Durand, F., and Seidel, H. P. 2004. Spherical Harmonic Gradients for Mid-Range Illumination. Rendering Techniques 2004: Eurographics Symposium on Rendering.

(Continued)

*Primary Examiner* — Joni Richer
(74) *Attorney, Agent, or Firm* — Faegre Baker Daniels LLP

(57) ABSTRACT

A method and apparatus for sorting data into spatial bins or buckets using a graphics processing unit (GPU). The method takes unsorted point data as input and scatters the points, in sorted order, into a set of bins. This key operation enables construction of a spatial data structure that is useful for applications such as particle simulation or collision detection. The disclosed method achieves better performance scaling than previous methods by exploiting geometry shaders to progressively trim the size of a working set. The method also leverages predicated rendering functionality to allow early termination without CPU/GPU synchronization. Furthermore, unlike previous techniques, the method can guarantee sorted output without requiring sorted input. This allows the method to be used to implement a form of bucket sort using the GPU.

8 Claims, 15 Drawing Sheets

(56) References Cited

OTHER PUBLICATIONS

Bell, N., Yu, Y., Mucha, P.J. Particle-Based Simulation of Granular Materials. In SCA '05: Proceedings of the 2005 ACM SIGGRAPH/Eurographics Symposium on Computer Animation, 2005, ACM, New York, NY, USA, 77-86.
Castaño, I. Tessellation of Displaced Subdivision Surfaces in DX 11. Presentation. Gamefest 2008, Seattle, WA, Jul. 2008.
Chen, H. 2008. Lighting and Material of HALO 3. Game Developer's Conference (San Francisco).
Deering, M. Geometry Compression. Sun Microsystems.
Everitt, C. 2001. Interactive Order-Independent Transparency. Technical report, NVIDIA Corporation.
Fiorini, P., and Shiller, Z. 1998. Motion Planning in Dynamic Environments Using Velocity Obstacles. International Journal on Robotics Research 17(7), 760-772.
Gee, K. 2008. Direct3D® 11 Tessellation. Presentation. Gamefest 2008, Seattle, WA, Jul. 2008.
Greene, N., Kass, M., and Miller, G. 1993. Hierarchical Z-buffer visibility. In SIGGRAPH '93: Proceedings of the 20th annual conference on Computer graphics and interactive techniques, ACM, New York, NY, USA, pp. 231-238.
Harada, T. 2007. Real-Time Rigid Body Simulation on GPUs. In GPU Gems 3, Nguyen, H. ed., Addison-Wesley.
Harada, T., Koshizuka, S., Kawaguchi, Y. Sliced Data Structure for Particle-Based Simulations on GPUs. In Graphite '07: Proceedings of the 5th International Conference on Computer Graphics and Interactive Techniques in Australia and Southeast Asia, 2007, ACM, New York, NY, USA, 55-62.
Harada, T., Koshizuka, S., Kawaguchi, Y. Smoothed Particle Hydrodynamics on GPUs. 2007, 63-70.
Harris, M.J., Baxter, W.V., Scheuermann, T., Lastra, A. Simulation of Cloud Dynamics on Graphics Hardware. In HWWS '03: Proceedings of the ACM SIGRAPH/Eurographics Conference on Graphics Hardware, Eurographics Association, 2003, Aire-la-Ville, Switzerland, Switzerland, 92-101.
Hu, Y. 2008. Lightmap Compression in HALO 3. Game Developer's Conference (San Francisco).
Jeong, W.-K, and Whitaker, R.T. 2007. A Fast Eikonal Equation Solver for Parallel Systems. SIAM conference on Computational Science and Engineering 2007, Technical Sketches.
Jeong, W.-K, and Whitaker, R.T. 2007. A Fast Iterative Method for a Class of Hamilton-Jacobi Equations on Parallel Systems. University of Utah School of Computing Technical Report UUCS-07-010.
Klein, A. 2008. Introduction to the Direct3D® 11 Graphics Pipeline. Presentation. Gamefest 2008, Seattle, WA, Jul. 2008.
Mammen, A. Transparency and Antialiasing Algorithms Implemented with Virtual Pixel Maps Technique. 1989, IEEE Computer Graphics Applications 9, 4, 43-55.
Millán, E., Hernández, B., and Rudomin, I. 2007. Large Crowds of Autonomous Animated Characters Using Fragments Shaders and Level of Detail. ShaderX5 : Advanced Rendering Techniques. Engel, W. (Editor), Charles River Media, Dec. 2006.
Oat, C., Barczak, J., Shopf, J.; Efficient Spatial Binning on the GPU, Feb. 2009, AMD Technical Report.
Purcell, T.J., Donner, C., Cammarano, M., Jensen, H.W., Hanrahan, P. Photon Mapping on Programmable Graphics Hardware. In Proceedings of the ACM SIGRAPH/Eurographics Conference on Graphics Hardware, 2003, Eurographics Association, 41-50.
Purnomo, B., Bilodeau, J., Cohen, J., Kumar, S. Hardware-Compatible Vertex Compression Using Quantization and Simplification, 2005, The Eurographics Association.
Shopf, J., Barczak, J., Oat, C., Taterchuk, N. March of the Froblins: Simulation and Rendering Massive Crowds of Intelligent and Detailed Creatures on GPU. Advances in Real-Time Rendering in 3D Graphics and Games Course—SIGGRAPH 2008, pp. 52-99, Game Computing Applications Group, AMD, Inc.
Shopf, J., Oat, C., Barczak, J. GPU Crowd Simulation.
Sloan, P. 2008. Stupid Spherical Harmonic (SH) Tricks. Game Developer's Conference (San Francisco).
Tatarchuk, N. 2008. Advanced Topics in GPU Tessellation: Algorithms and Lessons Learned. Presentation. Gamefest 2008, Seattle, WA, Jul. 2008.
Tatarchuk, N. Real-Time Tessellation on GPU. Presentation. Siggraph 2007. Game Computing Applications Group, AMD Graphics Products Group.
Treuille, A., Cooper, S., and Popović, Z. 2006. Continuum Crowds. ACM Trans. Graph. 25, 3 (Jul. 2006), pp. 1160-1168, Boston, MA.
Tsitsiklis, J. N. 1995. Efficient Algorithms for Globally Optimal Trajectories. IEEE Transactions on Automatic Control 40, 9 (Sept.), 1528-1538.
Van Den Berg, J., Patil, S., Sewall, J., Manocha, D., and Lin, M. 2008. Interactive Navigation of Multiple Agents in Crowded Environments. In Proceedings of the 2008 Symposium on interactive 3D Graphics and Games (Redwood City, California, Feb. 15-17, 2008). SI3D '08. ACM, New York, NY, 139-147.
Wang, L., Wang, X., Sloan, P., Wei, L, Tong, X., and Guo, B. 2007. Rendering from Compressed High Dynamic Range Textures on Programmable Graphics Hardware. ACM Symposium on Interactive 3D Graphics and Games.
Yeh, H., Curtis, S., Patil, S., Van Den Berg, J., Manocha, D., and Lin, M. 2008. Composite Agents. In the proceedings of ACM SIGGRAPH/Eurographics Symposium on Computer Animation 2008.
Zhang, F., Sun, H., Xu, L., and Lun, L. K. 2006. Parallel-split shadow maps for large-scale virtual environments. In VRCIA '06: Proceedings of the 2006 ACM international conference on Virtual reality continuum and its applications, ACM, New York, NY, USA, pp. 311-318.

* cited by examiner

METHOD AND APPARATUS FOR SPATIAL BINNING ON A GPU AND GLOBAL PATH PLANNING TO AVOID SPATIALLY BINNED OBJECTS

CROSS-REFERENCE TO RELATED APPLICATIONS

The present application claims the benefit of priority under 35 U.S.C. §119 from U.S. Provisional Patent Application No. 61/079,917, filed Jul. 11, 2008, entitled GPU CROWD SIMULATION; and from U.S. Provisional Patent Application No. 61/161,539, filed Mar. 19, 2009, entitled SIMULATION AND RENDERING MASSIVE CROWDS OF INTELLIGENT AND DETAILED CREATURES ON GPU; and from U.S. Provisional Patent Application No. 61/079,920, filed Jul. 11, 2008, entitled GPU-BASED SCENE MANAGEMENT FOR RENDERING LARGE CROWDS; which are all hereby incorporated herein in entirety by reference.

FIELD OF THE DISCLOSURE

The present disclosure is related to graphics processing on a graphics processing unit (GPU) and graphics processing related to crowd simulation.

BACKGROUND

Artificial intelligence (AI) is generally considered to be one of the key components of a computer game. Sometimes when we play a game, we may wish that the computer opponents were written better. At those times while playing against the computer, we feel that the game is unbalanced. Perhaps the computer player has been given different set of rules, or uses the same rules, but has more resources (health, weapons, etc.). The complexity of underlying AI systems, along with game design, belies the resulting feeling we have when playing any game. As the CPU and GPU speed and power continues to grow, along with increasing memory amounts and bandwidth, game developers are constantly improving the graphics of their games. In the last five years the production quality of games has been increasing (along with the corresponding budgets). Recent games woo players with incredible breakthroughs in real-time 3D graphics, complexity of the worlds and characters, as well as various post-processing effects. And while there had been tremendous improvements for parallelizing rendering through the evolution of consumer GPU pipelines, artificial intelligence computations are treading behind. To date, there had been rather few attempts at parallelizing AI computations.

Typically, in a game, AI controls the behavior of non-player-characters (NPC), whether they are friendly to the player or act as game opponents. This may include actual characters, or it can simply be tanks and armies (such as in a real-time strategy game), or monsters in a first-person shooter. The uniform feeling is that the better the AI is, the better the game. A more sophisticated AI system allows for more interesting and fun gameplay. Artificial intelligence is used for various parts of the game. Typical computations include path finding, obstacle avoidance, and decisions making. These calculations are needed regardless of the genre of interactive entertainment, be it a real-time strategy game, an MMORPG, or a first-person shooter. It may soon happen that dynamic character-centric entertainment in the form of interactive movies will evolve, where the viewer will have control over the outcome.

In many scenarios, the AI computations include dynamic path finding. This involves auto-simulating characters' behavior, and/or running a terrain analysis to identify good or update valid paths as result of gameplay. These computations can be quite a hog on CPU time budget, even in multi-core scenarios. As a result, many game developers are looking for ways to minimize the CPU hit of pathfinding. Because path finding and AI in general is such a compute-intensive, expensive calculation, we often see boring, zombie-like NPC interaction. Furthermore, when gameplay and physics are simulated on the CPU, and the characters are rendered on the GPU, there is an additional PCI-E data transfer overhead for character positions and state. It would be desirable to utilize the GPU for running in-game AI code to speed up path finding, and introducing a number of other interesting effects. Characters can start living on their own, resulting in so-called "emergent behaviors"—such as lane formation, queuing, and reactions to other characters and so on. And this means that game play will be a lot more fun.

Many applications require that an array of unsorted point data be sorted into spatial bins prior to being processed. For example, particle system simulations using the discrete element method (DEM) [Bell et al. 2005, Particle-based simulation of granular materials, In SCA '05: *Proceedings of the 2005 ACM SIGGRAPH/Eurographics Symposium on Computer Animation*, ACM, New York, N.Y., USA, 77-86; Harada 2007, Real-time rigid body simulation on gpus, In *GPU Gems 3*, H. Nguyen, Ed. Addison-Wesley, Upper Saddle River, N.J., USA, ch. 29 (hereinafter "Harada 2007").] require a nearest-neighbor search to apply particle-to-particle repulsive forces. It is important to use a spatial data structure to accelerate nearest-neighbor searches, as a brute-force search on n elements will require an expensive O(n) search per element. By partitioning the particles into spatial bins, the search can be limited to nearby particles, which dramatically reduces its computational cost.

In a GPU-based simulation, constructing these data structures on the GPU is necessary to maintain high performance. If these data structures are to be built by the CPU, particle positions must be transferred out of graphics memory into system memory, and the resulting data structure must be transferred in the opposite direction. In addition to consuming precious bus bandwidth, these kinds of hybrid GPU/CPU approaches require synchronization between GPU and CPU, which reduces utilization by introducing stalls.

Various previous approaches to spatial sorting on the GPU exist. [Purcell et al. 2003, Photon mapping on programmable graphics hardware, In *Proceedings of the ACM SIGGRAPH/EUROGRAPHICS Conference on Graphics Hardware*, Eurographics Association, 41-50] present two methods for sorting point data into grid cells on the GPU as part of their GPU-based photon mapping technique. Their first method sorts points by grid cell ID using a bitonic merge sort. This results in a sorted array in which points in the same grid cell are listed consecutively. A binary search step constructs a lookup table that contains array offsets for quickly finding each grid cell's data in the sorted array. As an optimization to the bitonic merge sort, the authors describe a method they call stencil routing for storing points in grid cells.

Stencil routing is a multi-pass algorithm that scatters point data into grid cells using the vertex shader. When a point lands in a grid cell, the stencil value associated with the cell is incremented to prevent additional points from being written to the cell. This ensures that, if multiple points map to the same grid cell, they will not overwrite each other. A depth test prevents the same point from being stored in a cell multiple times. For the depth test to function correctly, stencil routing requires that its input data be in sorted order. Stencil routing must iterate over the entire data set once for each storage location within a cell (loop count is equal to maximum cell capacity).

Amada et al. implements a GPU particle system that constructs a nearest-neighbor map on the CPU [2004]. The authors identify the neighbor map generation and its transfer to the GPU as the main bottleneck of their system. To overcome this bottleneck, stencil routing has been used to implement spatial data structures on the GPU, particularly for particle systems and particle-based rigid body simulations [Harada 2007; Harada et al. 2007, Smoothed particle hydrodynamics on gpus. 63-70 (hereinafter "Harada et al. 2007b")]. However, stencil routing among other issues requires the input data to be in sorted order.

Subsequent work [Harada et al. 2007, Sliced data structure for particle-based simulations on gpus. In *GRAPHITE '07: Proceedings of the 5th International Conference on Computer Graphics and Interactive Techniques in Australia and Southeast Asia*, ACM, New York, N.Y., USA, 55-62 (hereinafter "Harada et al. 2007a")] describes a sliced spatial data structure for point data on the GPU. This method employs a pre-pass over the point data to construct mapping functions that attempt to minimize wasted memory associated with unused cells in a uniform grid. A final stencil-routing step scatters the particles into cells within the grid.

None of the above items are efficient for various reasons which will be further discussed herein. Therefore, what is needed are methods and apparatuses for sorting point data into spatial bins using graphics hardware.

BRIEF DESCRIPTION OF THE DRAWINGS

The various embodiments will be more readily understood in view of the following description when accompanied by the below figures and wherein like reference numerals represent like elements, wherein.

DETAILED DESCRIPTION

Figure 1:
FIG. 1 illustrates one example of Froblins navigating to a mushroom patch goal and harvest food in accordance with an embodiment in the disclosure.

The present disclosure provides a method carried out by graphics processing circuitry that includes computing a bin address for a plurality of item identifiers, where the bin address corresponds to a texel space partion of a two-dimensional grid of bins, and where each bin has a corresponding bin address. The item identifiers are assigned unique item identifiers that are assigned to a plurality of graphical image items. The item identifiers are buffered as a depth texture array, and the depth texture array is sent to the graphics processing circuitry as a buffer of point primitives. The method then determines that an item identifier, of the plurality of item identifiers, is different than a previous item identifier placed at a bin address; and streams out the item identifier to a new working set. The method may further include determining, that an item identifier, of the plurality of item identifiers, is identical to a previous item identifier placed at a bin address; and marking the item identifier for deletion. The method includes selecting an item identifier for a bin address wherein the item identifier corresponds to a lowest depth value; and associating the item identifier to the bin address. The method may also include writing a pass number to a bin counter contained in a color buffer. The method defines the plurality of item identifiers as a working set; determines that the working set is not empty after writing the pass number;

and binds the working set to the depth texture array and sends it to the graphics processing circuitry.

The present disclosure also provides graphics processing circuitry that includes programmable shader logic operative to execute programmable instructions that when executed cause the programmable shader logic to compute a bin address for a plurality of item identifiers. As discussed above, the bin address corresponds to a texel space partion of a two-dimensional grid of bins, where each bin has a corresponding bin address, and where the item identifiers are assigned unique item identifiers that are assigned to a plurality of graphical image items. The item identifiers are buffered as a depth texture array and the depth texture array is sent to the graphics processing circuitry as a buffer of point primitives. The programmable shader logic is further operative to determine that an item identifier is different than a previous item identifier placed at a bin address, and stream out the item identifier to a new working set. The programmable shader logic is also operative to determine, that an item identifier, of said plurality of item identifiers, is identical to a previous item identifier placed at a bin address, and mark the item identifier for deletion. The logic also selects an item identifier for a bin address where the item identifier corresponds to a lowest depth value, and associates the item identifier to the bin address. The logic also writes a pass number to a bin counter contained in a color buffer. The programmable shader logic may further define the plurality of item identifiers as a working set, determine that the working set is not empty after writing the pass number. The working set is again bound to the depth texture array and sent to the graphics processing circuitry for another interation. In this way, the bin addresses are filled with the corresponding items and the working set is reduced at each iteration until the bins are accordingly filled and the working set is depleted.

The term "logic" as used herein includes software and/or firmware executing on one or more programmable processors, ASICs, DSPs, including graphics processing units (GPUs), hardwired logic or combinations thereof. Therefore, in accordance with the embodiments, various logic such as "shader logic" may be implemented in any appropriate fashion as would be understood by one of ordinary skill, such as, for example, in software, and would remain in accordance with the embodiments herein disclosed. The term "circuitry" as used herein includes such programmable processors, for example, a graphics processing unit usually referred to as a "GPU." The terms "agent," "character," "obstacle," and "item" all refer generally to three dimensional objects that may be displayed on a display. "Agent" is also used herein as a general term to refer to "characters," "obstacles" and "items." The terms "obstacle" and "item" are used herein interchangeably.

Further, while various exemplary software code is provided herein for implementing the various disclosed embodiments, such exemplary software code is not to be construed as limiting of the programming approach that may be employed to obtain the benefits of the features of the various embodiments herein disclosed. Therefore, other programming techniques may be employed, other than those provided as exemplary software code herein, to implement the disclosed embodiments and would therefore remain in accordance with the embodiments herein disclosed and as claimed.

In accordance with the embodiments described herein, agents may traverse a terrain while avoiding obstacles (also referred to as "items") and each other. The embodiments described herein provide a path-planning framework for large-scale crowd simulation that is suitable for operation on a GPU. This framework has been used to simulate 65,000 agents at real-time framerates on a single commodity GPU. By combining a continuum-based global path planner with a fine-grained avoidance model, expensive global planning may be performed at a coarse resolution and lower update rate while the local avoidance model takes care of avoiding other agents and nearby obstacles at a higher frequency. The embodiments enable crowd simulation to be performed entirely on a GPU.

For Global Path Planning, the embodiments employ a continuum-based approach. This type of method is particularly well suited for simulating large numbers of agents because it is computed spatially, instead of per-agent, and results in smooth movement with no "dead-ends." The environment is represented with a cost function. This cost function is then used as input to a GPU-based eikonal solver that calculates the travel-time (potential) from any location to the nearest goal. By following the gradient of this potential field, agents are guaranteed to always be moving along the shortest path to the global goal, considering the speed at which an agent can travel based on terrain features, obstacles and agent density.

For Local Avoidance, unfortunately, solving the eikonal equation at a resolution high enough for large numbers of agents to avoid each other with acceptable fidelity is prohibitively expensive for a real-time application. The embodiments augment the global eikonal solution with a local avoidance model that allows agents to avoid each other and small-scale obstacles. This avoidance model computes agent velocities by examining the direction determined by the global model and the positions and velocities of nearby agents. This avoidance model is based on the Velocity Obstacle formulation.

Determining the positions and velocities of dynamic local obstacles requires a spatial data structure containing all obstacle information in the simulation. The embodiments provide a novel multi-pass method for sorting agents (including obstacles/items) into spatial bins. Agents are rasterized as point primitives into a bin based on their locations. Agent IDs are stored in a depth texture array and bin loads are stored in a color buffer. The GPU's depth-test unit ensures that agent IDs are inserted into bins in sorted order and the alpha blend unit is used to increment bin load counters as agents are binned. Agents are binned in parallel but only a single agent is placed into a particular bin per iteration.

As agents are placed into bins, they are removed from the working-set using stream-out. This prevents agents from being re-processed during subsequent iterations. This process is repeated once for each bin slot, using predicated rendering to terminate early once all elements have been binned. The spatial data structure is queried by first reading the bin load (n) from the color buffer and then loading n agent IDs from the depth texture array.

For direction determination, each agent evaluates a number of fixed directions relative to the goal direction determined by the global solution. For example, five directions have been used in an example application but more can be used for increased motion fidelity. Each direction is evaluated to determine the time to collision with agents in the current or adjacent bins. Each direction is given a fitness function based on the angle relative to the desired global direction and the time to collision. Time to collision is determined by evaluating a swept circle-circle collision test, in which the radius of each circle is equal to the radius of the bounding circle of the associated agent. The updated velocity (Equation 7) is then calculated based on the direction with the largest fitness function result (Equation 6) and the smallest time to collision in that direction.

$$\text{fitness}(vp_i) = w_i t(vp_i) + (v_i \cdot vp_i) \cdot .5 + .5 \quad \text{(See equation 5 below)}$$

$$v_i = \underset{vp_i \notin V}{\arg\max} \text{ fitness}(vp_i) \quad \text{(See Equation 6 below)}$$

$$v_{final} = \hat{v_i} * \min(s_a, s_a t(\hat{v_i})/\nabla ft) \quad \text{(See Equation 7 below)}$$

where $\omega_i$ is a per-agent factor affecting the preference to move in the global direction or avoid nearby agents, t(x) returns the minimum time-to-collision with all agents in direction x, V is the set of discrete directions to evaluate, $v_i$ is the global direction, $s_a$ is the speed of agent α, and ∇ft is time-delta since the last simulation frame.

The apparatus disclosed combines massively parallel AI computations with high fidelity rendering algorithms. Below are described simulation and rendering methods used for a "Froblins" demo, designed to showcase new approaches for character-centric entertainment. These techniques are made possible by the massively parallel compute available on the latest commodity GPUs, such as ATI Radeon® HD 4800 series. In one example of a large-scale environment with thousands of highly detailed, intelligent characters, the Froblins (frog goblins), are concurrently simulated, animated and rendered entirely on the GPU. The individual character logic for each Froblin creature is controlled via a complex shader (over 3200 shader instructions). This may be implemented using functionality available with the DirectX® 10.1 API, hardware tessellation, high fidelity rendering with 4×MSAA settings, at HD resolution with gamma-correct rendering, full high dynamic range FP16 pipeline and advanced post-processing effects. Figures herein illustrate a crowd behavior simulation performed directly on the GPU. A GPU-friendly path-planning framework is described for large-scale crowd simulation. This framework can also be used to simulate larger crowds of simplified agents with smaller polygonal count. In on example, the system has been used to simulate 65,000 agents at real-time frame rates on a single commodity GPU. By combining a continuum-based global path planner with a fine-grained agent-based local avoidance model, the system performs expensive global planning at a coarse resolution and lower update rate while the local model takes care of avoiding other agents and nearby obstacles at a higher frequency. It is believed that this is the first massive crowd simulation performed entirely on a GPU (i.e., one or more graphics processor cores).

Figure 19:
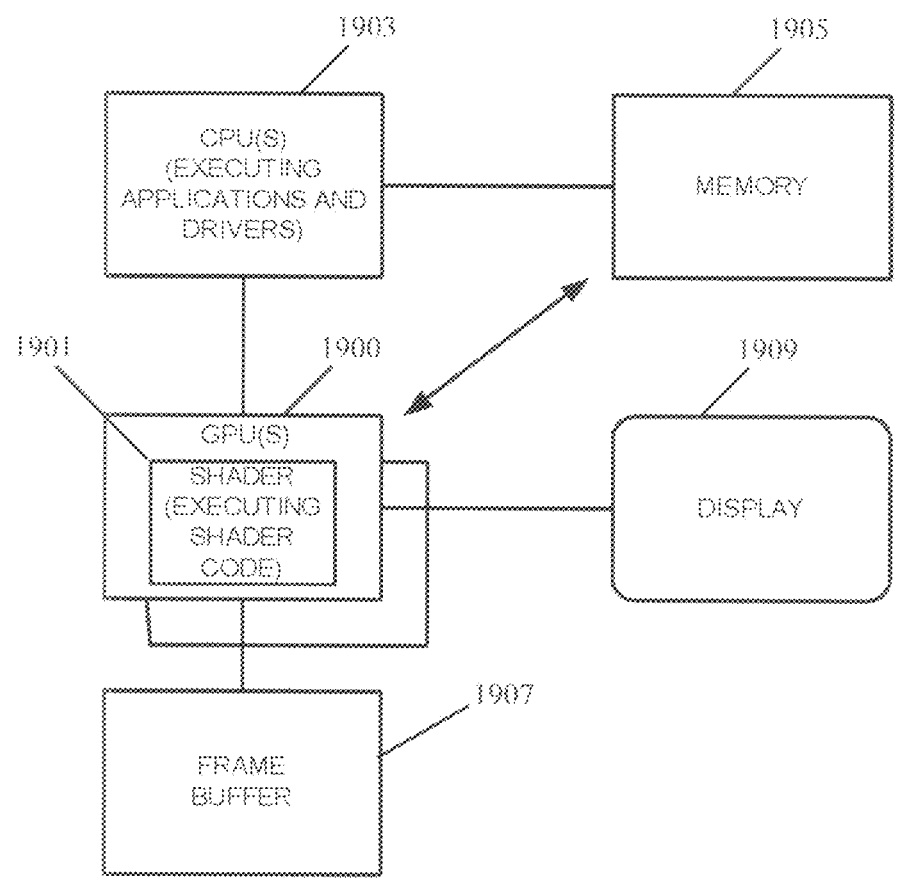
FIG. 19 is a block diagram illustrating one example of an apparatus in accordance with one example set forth in the disclosure.

The system, or apparatus for example, may be a work station, laptop, desktop computer or any other suitable apparatus. As shown in FIG. 19, the apparatus may include one or more CPUs 1903 that are connected via a suitable bus structure to one or more GPUs (graphics processing cores) 1900. The graphics processing units output display information to a display 1909 via a suitable communication link. The GPU(s) 1900 is coupled to a frame buffer to store intermediate data, frames to be displayed on a display 1909, and any other suitable information. The apparatus also includes memory 1905 such as system memory or distributed memory that is coupled to the CPU 1903 via a bus structure. The memory may also be coupled and accessible to the GPU 1900 via any suitable bus architecture. Any other suitable configuration may also be employed. The GPU 1900 employs pixel and vertex shaders (collectively 1901) such as executing shader code that are executed by one or more processors in the GPUs 1900 as known in the art. The GPUs 1900 may also includes internal RAM and ROM that may be suitably used as known in the art. The frame buffer 1907 memory also may be any suitable memory including RAM and/or ROM memory. The memory may be used to store executable instructions that when executed cause the GPU 1900 or CPU 1903 to operate as described herein.

Figure 5:
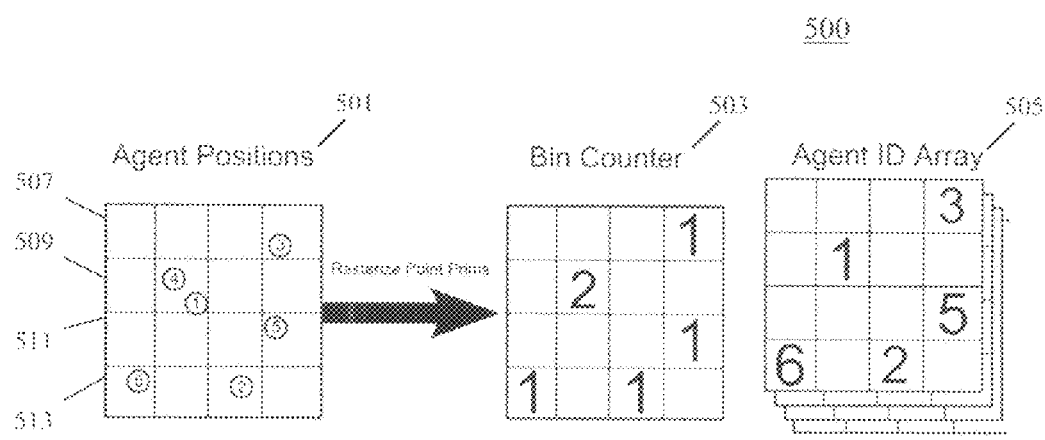
FIG. 5 illustrates agent positions that are rasterized into a bin counter and an array containing IDs of agents in that bin in accordance with an embodiment in the disclosure.
Figure 20:
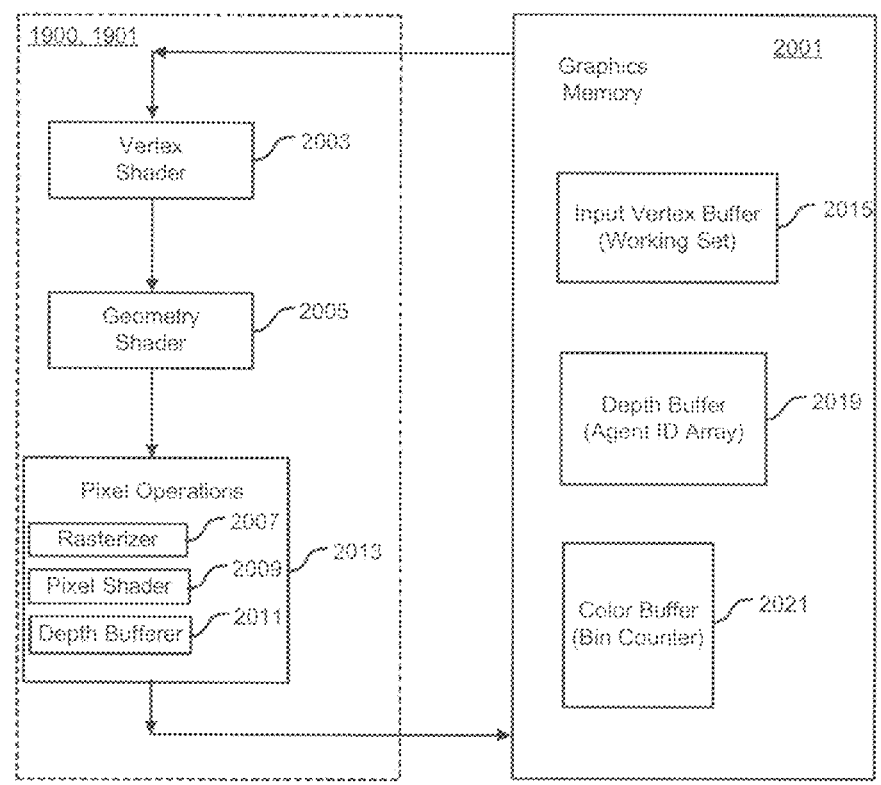
FIG. 20 provides further details of the apparatus shown in FIG. 19 and described herein throughout.

FIG. 20 provides further details of the embodiments described herein, and relates a data structure shown in FIG. 5 to graphics memory. The GPU 1900 and shader code 1901 are shown including the vertex shader 2003, geometry shader 2005 and various pixel operations 2013 including a rasterizer 207, pixel shader 209 and depth bufferer 211. The various "shaders" are "shader logic" or "logic" and are therefore programmable logic as was discussed above.

The interactive environment renders thousands of animated intelligent characters from a variety of viewpoints ranging from extreme close-ups (with individual characters rendered at over 1.6 million triangles for close-up detail) to far away "bird's eye" views of the entire system (over three thousands characters at the same time). The system combines state-of-the-art parallel artificial intelligence computation for dynamic pathfinding and local avoidance on the GPU, massive crowd rendering with LOD management with high end rendering capabilities such as GPU tessellation for high quality close-ups and stable performance, terrain system, cascaded shadows for large-range environments, and an advanced global illumination system. Rendering of the world can be done at interactive rates (over 20 fps on ATI Radeon® HD 4870) with staggering polygon count (6-8 million triangles on average at 20-25 fps), while maintaining the full high quality lighting and shadowing solution. Artificial Intelligence on GPU for Dynamic Pathfinding includes Global Pathfinding. Many systems for crowd simulations rely on agent-based solutions, where the movement is computed for individual agents separately. While there are certain advantages to this approach (independent decisions for each agent, individual visibility and environment information), it is also challenging to develop behavioral rules for the agents that result in a consistent and realistic overall crowd movement. At the same time, scaling agent-based methods for a large number of agents is prohibitively computationally expensive, which is a concern for interactive scenarios, such as video games.

In contrast, the disclosed system employs a continuum-based approach similar to the Continuum Crowds work by Treuille et al. (see for example, Treuille, A., Cooper, S., and Popović, Z. 2006, Continuum Crowds, ACM Trans. Graph. 25, 3 (July 2006), pp. 1160-1168, Boston, Mass.). This method converts motion planning into an optimization problem, using well-known numerical methods from optics and general physics for stable navigation solution.

This type of method is particularly well suited for simulating large numbers of agents because it is computed spatially, instead of per-agent, and results in smooth movement with no "dead-ends". Additionally, a continuum approach results in flow-like movement which is characteristic of actual large crowds. The global model is only an approximation to accurate long-term planning with full visibility and decision logic, and accordingly, the system augments this by local collision avoidance problem. Together these methods produce smooth and realistic crowd movement, especially in areas of dense congestion.

In this continuum-based crowd simulation, the environment is formulated as a cost function (sometimes referred to as a speed function). This cost function incorporates both the achievable speed (based on terrain slope, etc.) and avoidance factor (based on agent density, large-scale obstacles, etc.) for locations in the environment. This cost function describes the travel-time to move from one location to a neighboring location and is used to evaluate the optimal path.

This cost function is then used as input to a solver that calculates the total travel-time (potential) from any location to the nearest goal. This potential ($\phi$) is calculated such that it satisfies the eikonal equation:

$$\|\nabla\phi(x)\| = F, \quad (1)$$

where F is the positive-valued cost function evaluated in the direction of the gradient $\nabla\phi(x)$. It is intuitive to see how the function $\phi$ could be constructed by integrating the cost function along the shortest-path from every location x. In this context, it can be thought of as the global crowd movement as computing a propagating wave front, following the path of least resistance.

Figure 2:
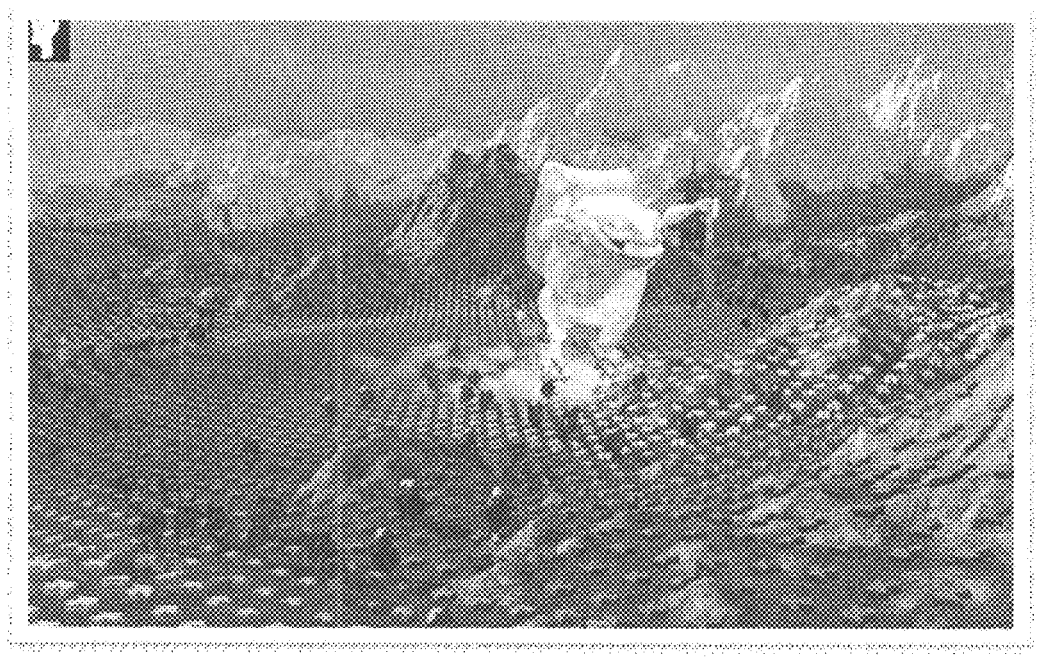
FIG. 2 illustrates one example of dynamic path finding in game-like scenario in accordance with an embodiment in the disclosure.

FIG. 2. Example of dynamic path finding in game-like scenario. The arrows visualize character movement directions. As the large ghost Froblin scares away the little critters, they scamper away. Note that the arrows near the "monster" are pointing away, directing the characters away from a potential threat.

By following the gradient of the generated potential field, agents are guaranteed to always be moving along the shortest path to the global goal considering the speed at which an agent can travel based on terrain features, obstacles and agent density (congestion).

Global Pathfinding CPU Implementation. A fast and simple-to-understand computational algorithm to approximate the solution to the eikonal equation is the Fast Marching Method (see for example, Tsitsiklis, J. N. 1995, Efficient Algorithms for Globally Optimal Trajectories, IEEE Transactions on Automatic Control 40, 9 (September), 1528-1538), which is summarized below. Because the potential is only known for the goal location, the system begins by setting $\phi=0$ at the goal cell and adding this cell to a list of KNOWN cells. All other cells are added to an UNKNOWN list, with their potential set to $\infty$. The algorithm then proceeds as follows:

All UNKNOWN cells adjacent to a KNOWN cell are added to a NEIGHBOR list

The potential at each NEIGHBOR cell is calculated based on the potential at the neighboring KNOWN cells and the cost to get from the KNOWN cells to the NEIGHBOR cell in question Update the NEIGHBOR cell with the smallest potential found in step 2 and add it to the list of KNOWN cells Repeat until all cells are in the KNOWN list Note that the above algorithm is identical to Dijkstra's method. The difference between Dijkstra's and the Fast Marching Method is the way that the potential is calculated in step 2. Solving the continuous eikonal equation by using Dijkstra's method on a discrete grid will not converge and stair-stepping artifacts will result regardless of the number of times the grid structure is refined.

Figure 3:
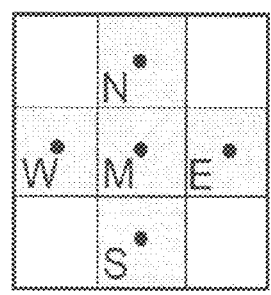
FIG. 3 illustrates one example of neighboring cells used in finite difference approximation in accordance with an embodiment in the disclosure.

FIG. 3. Illustration of neighboring cells used in finite difference approximation.

Tsitsiklis presents a finite difference approximation to the continuous eikonal equation that eliminates the stair-stepping problem. First, the upwind directions are identified as the least costly neighbors in the x and y directions (see also FIG. 3):

$$n_x = \operatorname*{argmin}_{i \in \{W,E\}}[\varphi_i + C_M] \quad (2)$$

$$n_y = \operatorname*{argmin}_{i \in \{N,S\}}[\varphi_i + C_M]$$

The finite difference approximation is then computed using the greatest solution to $\phi M$ in the quadratic equation:

$$\left(\frac{\varphi_M - \varphi_{n_x}}{C_M}\right)^2 + \left(\frac{\varphi_M - \varphi_{n_y}}{C_M}\right)^2 = 1 \quad (3)$$

In the case that $n_x$ or $n_y$ is undefined (neither neighbor along an axis is KNOWN), then eliminate the term containing that axis from the equation. Once $\phi M$ is found for all cells, the gradient $\nabla\phi$ can be easily calculated.

However, the Fast Marching Method is a serial algorithm and not amenable to parallelization, and, by extension, not highly suitable for efficient GPU computation.

Global Pathfinding GPU Implementation. There is a method for solving the eikonal equation in parallel. The Fast Iterative Method (see for example, Jeong, W.-K, and Whitaker, R. T. 2007, A Fast Eikonal Equation Solver for Parallel Systems, SIAM conference on Computational Science and Engineering 2007, Technical Sketches; Jeong, W.-K, and Whitaker, R. T. 2007, A Fast Iterative Method for a Class of Hamilton-Jacobi Equations on Parallel Systems, University of Utah School of Computing Technical Report UUCS-07-010) uses the same upwind finite difference approximation described above but requires no ordered data structures to maintain lists such as KNOWN, UNKNOWN, etc. The idea is to only perform updates to the potential function at the band of cells which are active. In practice, a list of individual active cells does not need to be maintained. A list of active tiles, or spatially coherent blocks of cells, is maintained. Intuitively, the list of active tiles is initialized to contain the tile containing the source (the goal in the application). The algorithm is summarized as follows:

Iterate n times on all cells in the active tiles;

Compare each cell in each active tile to the previously computed potential value for that cell. If the difference is within some small threshold, mark it as converged;

For each active tile, perform a reduction on the convergence results to determine if the entire tile is converged;

Perform one iteration on all tiles neighboring the tiles determined to have converged in step 3 to see if any cell values change;

Update the active list of tiles to reflect all tiles that became inactive due to convergence or that were identified as being reactivated in step 4.

The authors reported 4-6× performance improvements over optimized CPU implementations for their tile-based implementation.

However, the disclosed system further simplifies this algorithm because the complexity of the cost function does not vary greatly and the cell grids are small relative to the large datasets used in the authors' work.

Because datasets are small ($128^2$ or $256^2$), the constant overhead of performing tests for convergence outweighs the gains from culling computation and impacts performance negatively. In other aspects, the operation may be similar to the above. In order to ensure that the solver converges a conservative estimate is made of the number of iterations needed. The number of iterations used in the solver was determined empirically by examining worst-case cost function complexity.

By calculating four eikonal solutions at once, the system is able to achieve 98% ALU (in the GPU) utilization on an ATI Radeon™ HD 4870 with GDDR5 memory. This yields very high computational throughput. The GPU based solver computes a $256^2$ solution in 20 ms which is faster than a CPU implementation by a factor of approximately 45. The performance data was collected on an AMD Phenom™ X4 Quad-Core CPU system with 2 GB of RAM and an ATI Radeon™ 4870 graphics card with 512 MB of GDDR5 video memory and regular engine and memory clocks. HLSL source code for the iterative eikonal solver is listed in Appendix A.

Constructing the Cost Function. Solving the eikonal equation requires a cost function that can be evaluated at each grid cell. The cost function for the environment in the Froblins demo is computed as follows:

$$F(x)=aT(x)+bD(x)+cA(x), \quad (4)$$

where F is the final cost function, T is the static movement cost (including terrain movement cost equivalent to slope as well as any large static objects such as buildings), D is the density of agents and A is the cost related to dynamic hazards. a, b, and c are weights that can be adjusted spatially to encourage different pathing depending on the situation. For example, it may be desired to increase the cost due to agent density near a goal to prevent overcrowding at goals.

Once the scalar cost function F(x) is constructed (equation 4), it can be supplied to the eikonal solver to calculate $\phi(x)$. The gradient of $\phi(x)$ is calculated using central differences.

Figure 4:
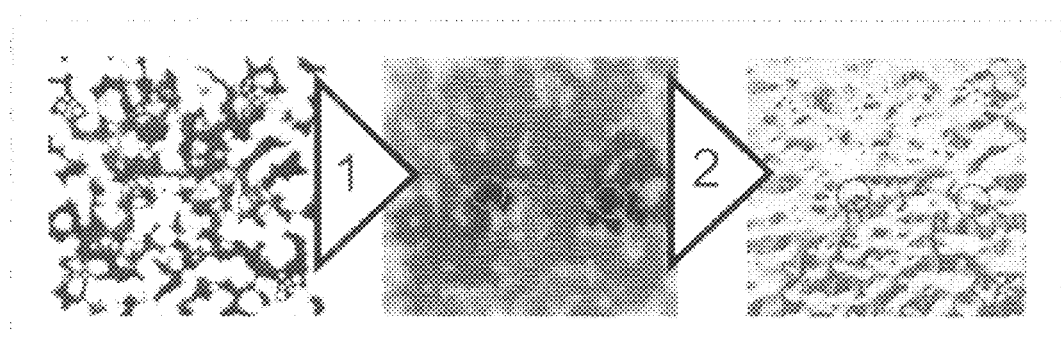
FIG. 4 illustrates one example of a cost function, potential, gradient of potential in accordance with an embodiment in the disclosure.

FIG. 4 illustrates Left to Right: Cost function, potential, gradient of potential. The goals (sources) are at the center of the blue marker.

Local Navigation and Avoidance. Unfortunately, solving the eikonal equation at a resolution high enough for large numbers of agents to avoid each other with acceptable fidelity is prohibitively expensive for a real-time application. In order to have an accurate behavior model for the characters, it may be desirable to augment the global eikonal solution with a local avoidance model that resolves these fine-grained obstacles.

The basic goal of a local model is to provide each individual agent with a velocity that will prevent collisions with nearby agents and also to navigate around obstacles and agents towards its desired destination. This is typically handled by a continuous cycle of examining the nearby environment and reacting based on the discovered information.

Method. The local navigation and avoidance model computes agent velocities by examining the movement direction determined by the global model and the positions and velocities of nearby agents. This avoidance model is based on the Velocity Obstacle formulation (see for example, Fiorini, P., and Shiller, Z. 1998. Motion Planning in Dynamic Environments Using Velocity Obstacles. International Journal on Robotics Research 17(7), 760-772).

For the model, each agent is presented as a disc. Each agent $A_i$ therefore has a position $p_i$, a velocity $v_i$, a radius r, a maximum speed $s_i$, and a global goal direction $g_i$ provided by the global solver. An orientation $\theta_i$ is inferred from $v_i$ by assuming that the agent is oriented towards $v_i$. In this example, all agents have a similar radius and therefore r is constant for all agents.

As in most local models, updating $p_i$ and $v_i$ for $A_i$ requires knowledge of the $p_n$ and $v_n$ for all agents $A_n \in A_{near}$, where $A_{near}$ is the set of all agents within a certain distance.

Spatial Queries via Novel GPU Binning Determining the positions and velocities of dynamic local obstacles requires a spatial data structure containing all obstacle information in the simulation. The disclosed embodiments provide new methods and apparatuses for sorting point data into spatial bins using graphics hardware. The method operates by repeatedly scattering point primitives into successive slices of a texture array. Dual-depth testing [Everitt 2001] is used to ensure that all elements are binned sequentially (and, as a side effect, causes them to be binned in sorted order). Unlike previous techniques, the present embodiments use geometry shaders to eliminate previously binned elements from the working set, which provides significantly better performance scaling. The embodiments may be implemented using any Direct3D® 10 capable consumer hardware, without need for proprietary GPU compute APIs.

Figure 21:
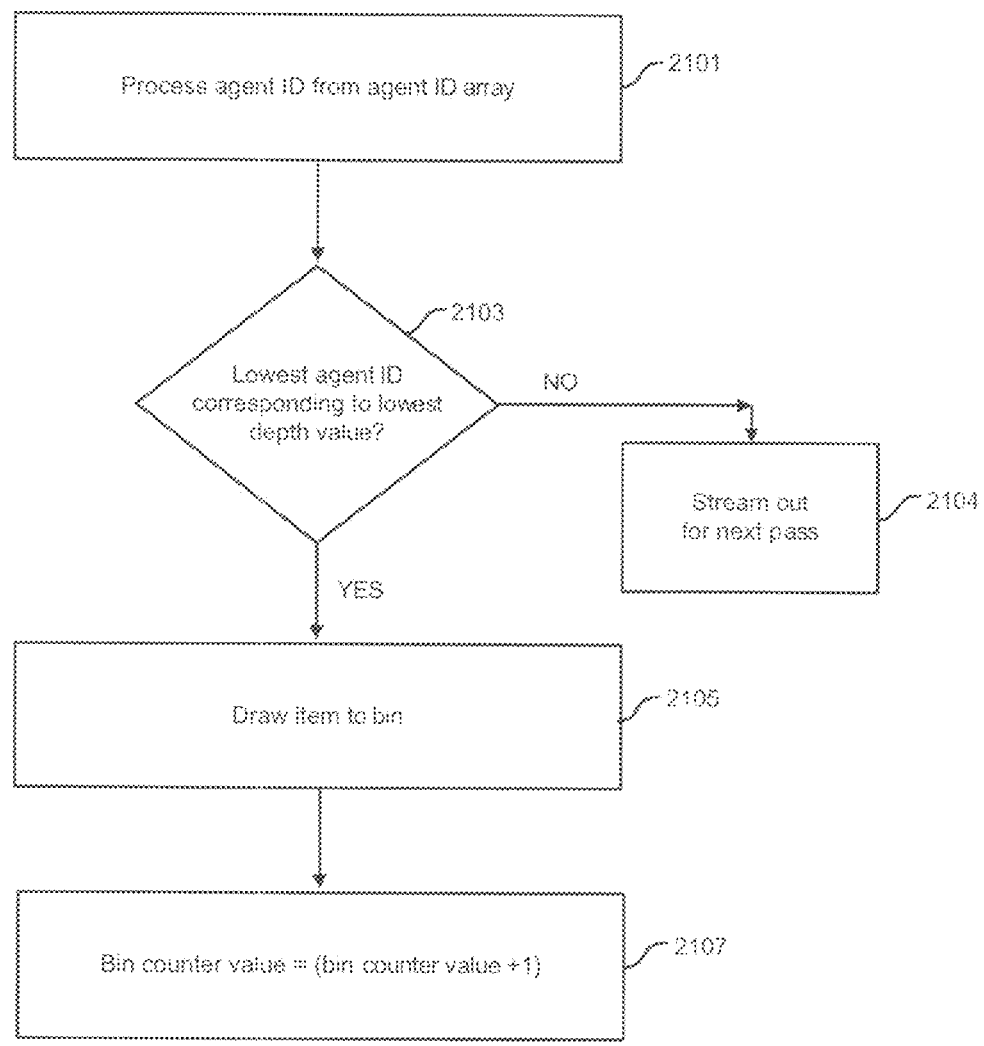
FIG. 21 is a flowchart of a binning operation in accordance with the embodiments and as described herein.
Figure 22:
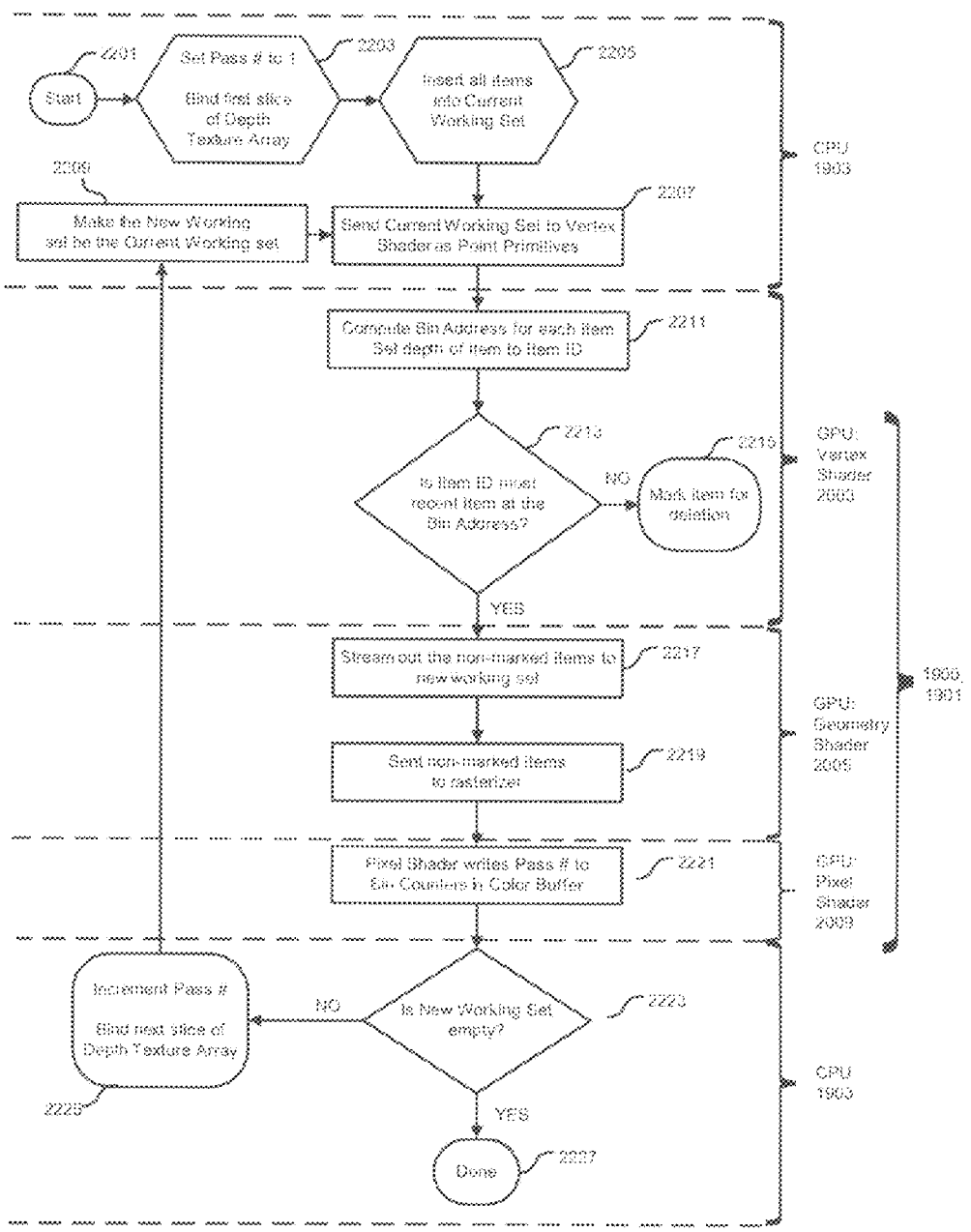
FIG. 22 is a flowchart providing further details of operation of the embodiments as described herein.

The methods are summarized in FIG. 21 and FIG. 22. The system employs a novel multi-pass algorithm for sorting agents into spatial bins directly on the GPU. The methodology uses a 2D depth texture array (FIG. 20, 2017) and a single 2D color buffer (FIG. 20, 2019) to construct a data structure for storing agents in bins. The depth texture array 2017 serves as an Agent ID Array. A given 2D texel address in this array serves as a bin. A single bin is a 1D array texture array slice. An example of such bins on a grid representing a texture array slice is shown in FIG. 5 The bin array grows down through successive texture array slices. Each slice of the texture array contains a single agent ID (bin element). The agent IDs are stored in bins in ascending sorted order by agent ID. The number of agents that fall into a given bin may be less than the bin capacity (which is defined by the number of depth array slices). In order to efficiently query the agent IDs in a given bin, a Bin Counter is used. The Bin Counter is a 2D color buffer (FIG. 20, 2019) that records the load on each bin in the Agent ID Array (FIG. 20, 2017).

To find all agents near a particular world space position, the position is translated into a 2D bin address. Any translation function may be used. In this example, the world domain is square so a simple uniform grid was used to map world space positions to bins. Once the bin address is known, the bin load is read from the Bin Counter. This gives the number of agents that are in the bin that the system is interested in. Finally, the each agent's ID in the bin is read from the Agent ID array.

This data structure must be updated each frame as agents move about the world. Updates are performed using an iterative algorithm that begins with all agent IDs in a buffer called the working set. Each iteration, as agents are placed into bins, they are removed from the working set. The algorithm continues to iterate until the working set is reduced to zero.

FIG. 5. Agent positions are rasterized into a bin counter and an array containing IDs of agents in that bin. These IDs are later used to retrieve agent positions and velocities.

The method begins by clearing the Bin Counters to 0 to indicate that the bins are empty and all slices of the Agent ID Array are cleared to 1.0. For the first iteration, the top-most slice of the Agent ID Array is bound as the current depth buffer (FIG. 22, 2203) and the Bin Counter is bound as the current color target. The working set, containing all agent IDs, is bound as the input vertex buffer (FIG. 20, 2015) and each element is rasterized as a single point primitive. As each point passes through the vertex shader 2003, the point's screen space position is set by mapping the associated agent's world position to a bin address as mentioned above. The normalized agent ID is stored as the point's depth value. The GPU's depth-test unit is configured to pass fragments that are less than the depth value stored in the depth buffer 2017. As a result, of all the agents that map to a given bin, only the agent with the lowest ID (corresponding to the point with the lowest depth value) will be drawn into that bin. Since the GPU can only write a single agent to a given bin per iteration, the pixel shader 2009 simply outputs 1 resulting in the bin counter 2019 being set to 1 at bins that received an agent. Bins that did not receive any agents will remain set to their initial cleared value of 0. If multiple agents map to a single bin, the agent with the lowest ID will get written and other agents will be rejected to be processed on a subsequent pass.

For the second iteration of the algorithm, the second slice of the Agent ID Array is set as the current depth target and the agents are processed once again. No agents were removed from the working set on the first pass so the second iteration once again takes as input a working set containing all agents.

This time the vertex shader 2003 does some additional work, it rejects the current point primitive if its agent ID is less than or equal to the ID stored in the previous Agent ID Array slice. Points are marked as "rejected" by setting their depth value to some value outside of the valid depth range. The depth unit is still configured to less than function, so, much like depth-peeling (see for example, Everitt, C. 2001. Interactive Order-Independent Transparency, technical report, NVIDIA Corporation), the GPU effectively implements a dual depth buffer which results in the point with the lowest ID that is greater than the previously binned ID to pass. Performing the "greater than" test in the vertex shader rather than the pixel shader allows us to avoid inserting clip/kill instructions in the pixel shader and allows the GPU to perform early-z culling.

After vertex shading, points are passed to a geometry shader (FIG. 20, 2005). The geometry shader 2005 tests the point's depth value and only allows non-rejected points to both be sent to the rasterizer and to be streamed out. This is shown in the flowchart of FIG. 22 as blocks 2215, 2217 and 2219. Points that are marked for rejection as shown in block 2215 are simply discarded; not rasterized and not streamed out. The pixel shader 2009 is set to output 2 so that the Bin Counter 2019 will be set to 2 at locations where points are written. At the end of this pass, the resulting stream-out buffer will contain all the agents that were binned during this iteration along with all the agents that have not yet been binned. The stream-out buffer will not contain agents that were binned in the previous iteration since they will have been marked for rejection during the vertex shader's "greater than" test and thus will not have been streamed out in the geometry shader. This stream-out buffer becomes the new working set and is used as input for subsequent iterations of the method.

Subsequent passes follow much like the second iteration of the method. Each time: the depth target is set to the next slice of the agent ID array, the pixel shader is set to output current iteration number, and a new working set is created for use in the next pass. Each iteration results in a reduced working set. The method continues to iterate until the working set is reduced to zero. An overflow condition occurs if the iteration count reaches or exceeds the Agent ID Array depth before the working set is reduced to zero. This can occur if too many agents land in a given bin but in practice overflow can be prevented by using a large enough number of bins so that agents are sufficiently distributed to avoid overflow. Also, the depth of the Agent ID Array can be increased to accommodate higher bin loads.

A ping-ponging technique is used to manage the working set buffers. The "ping" buffer contains the current working set and acts as input during one iteration while the "pong" buffer acts as the output buffer. The roles of the ping and pong buffers are swapped after each iteration.

Two techniques are used to avoid CPU/GPU synchronizations that would result in rendering pipeline stalls. Predicated rendering feature of Direct3D® 10 is used to control the execution of each iteration. Ideally the algorithm should only continue to iterate as long as the previous iteration resulted in a stream-out buffer with non-zero length. Unfortunately if execution was controlled on the CPU by issuing GPU queries after each pass to determine if the algorithm had completed, stalls would be introduced in the rendering pipeline due to CPU/GPU synchronization and this would degrade performance.

To avoid synchronization stalls, all the draw calls for the maximum number of iterations (corresponding to the maximum allowable bin load) are made up front. The method terminates in 2227 once all agents have been binned so predicated draw calls are used to terminate upon completion. The draw calls for each iteration are predicated on the condition that the previous iteration resulted in agents being streamed out. If no agents are streamed out then the working set has been reduced to zero and the operation can terminate. Using cascading predicated draw calls in this way will result in the remaining draw calls being skipped. Thus the GPU takes full responsibility for terminating the method once all the agents have been binned. The Direct3D® 10 DrawAuto call is used to issue each predicated draw since the size of the working set from iteration to iteration is unknown.

Spatial data structures provide some benefits over previous techniques (see for example, Harada 2007). Querying the data structure is efficient because bin loads are stored in a Bin Counter thus allowing the GPU to only read the necessary number of elements from the Agent ID Array and even early-out when a bin is determined to be empty. Additionally the technique provides a mechanism for detecting overflow, employs iterative stream-out reduction of the working set, and gives execution control to the GPU to avoid pipeline stalls.

Agent Movement Direction Determination. Agent's directions need to change as a result of pathfinding and local avoidance models' computations. Each agent evaluates a number of fixed directions relative to the goal direction determined by the global solution. Five directions are used in this application. More can be used for increased motion fidelity. The suitable number of directions for the application was determined empirically by evaluating desired motion fidelity versus performance overhead for computing more directions. Each direction is evaluated to determine the time to collision with agents in the current or adjacent bins. Each direction is given a fitness function based on the angle relative to the desired global direction and the time to collision. Time to collision is determined by evaluating a swept circle-circle collision test, in which the radius of each circle is equal to the disc radius r of the agents.

The updated velocity (Equation 7) is then calculated based on the direction with the largest fitness function result (Equation 6) and the smallest time to collision in that direction.

$$\text{fitness}(vp_i) = w_i t(vp_i) + (g_i \cdot vp_i).5 + .5 \quad (5)$$

$$\text{fitness}(vp_i) = w_i t(vp_i) + (v_i \cdot vp_i) \cdot .5 + .5$$

$$v_i = \underset{vp_i \in V}{\text{argmax}} \, \text{fitness}(vp_i) \quad (6)$$

$$v_{final} = \hat{v}_i \min(s_a, s_a t(\hat{v}_i) / \nabla ft) \quad (7)$$

where $w_i$ is a per-agent factor affecting the preference to move in the global direction or avoid nearby agents, t(x) returns the minimum time to collision with all agents in direction x, V is the set of discrete directions to evaluate, $g_i$ is the global navigation direction, $s_a$ is the speed of agent a, and ∇ft is the time-delta since the last simulation frame.

Figure 6:
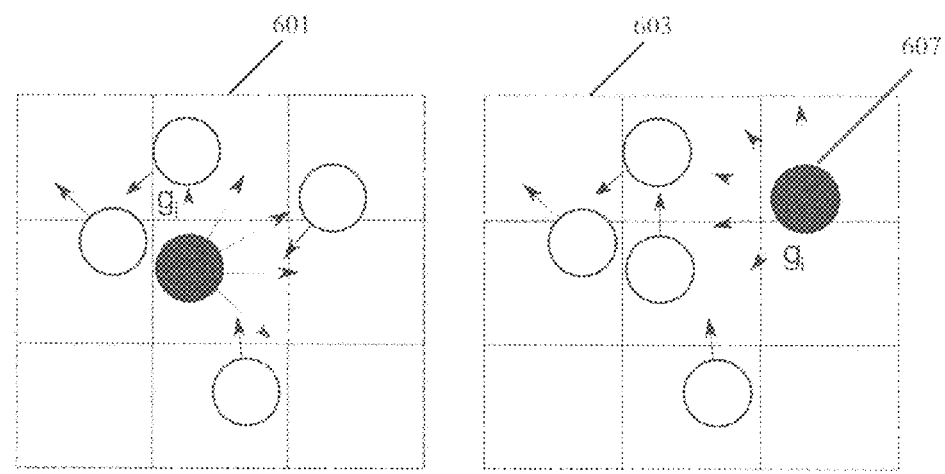
FIG. 6 illustrates two agents and their corresponding V sets in accordance with an embodiment in the disclosure.

FIG. 6. Each agent evaluates a fixed number of potential movement directions based on the positions and velocities of agents in its current and adjacent bins. Two agents and their corresponding V sets are shown.

Two example sets of directions to be evaluated for velocity update are shown in FIG. 6. Note that the two sets are identical in the local coordinate frame defined by the agent and its global navigation direction $g_i$. In this example, only directions are evaluated that would cause a "right turn" change in orientation. This eliminates the need to arbitrate which direction an agent should turn based on the velocities of other agents and also results in fewer collision tests. In practice, this limitation is not very noticeable or distracting. Hence, any direction(s) may be used.

It is important to note that in this example, a simple kinodynamic constraint was employed to restrict an agent's change in velocity. It is desired to throttle the change in orientation in a given time step because agents have a physical limit to how fast they can change their orientations. This prevents sudden broad changes in orientation in dense agent situations.

Agent State Management. As agents navigate around the environment, it is important to maintain information about their current state. This includes data such as current position and velocity, current group ID, current animation cycle (or action) and current time within that animation cycle. The system also maintains per-agent data such as maximum speed and goal achievement distance. Goal achievement distance is a random value is used to determine the distance from the goal at which an agent has reached that goal. This is rather specific to the specific goal types such as mushroom and gold patches where the goal has a specific area and the boundaries are nebulous.

Agent animation cycle transitions are performed using dynamic flow control within the shader controlling agent update logic. If the current time within an animation cycle is greater than the length of the current animation, several conditions are checked to determine what animation cycle should be part of the agent's state. These are: current animation cycle, distance from nearest goal, number of agents nearby, distance from fear inducing obstacles such as the ghost froblin and noxious gas clouds, and current group. While these agent updates will not be very coherent, the agent data texture is very small and the performance impact is slight. Despite the dimensionality of input to the animation transition function, it may be possible to precompute the animation transition logic into textures (as done in Milian, E., Hernandez, B., and Rudomin, I. 2007, Large Crowds of Autonomous Animated Characters Using Fragments Shaders and Level of Detail, ShaderX5: Advanced Rendering Techniques. Engel, W. (Editor), Charles River Media, December 2006) and eliminate flow control.

Pathfinding Results Discussion. In one example, the approach has been used to simulate ~65,000 agents at interactive rates on an ATI Radeon™ HD 4870 while performing intensive rendering tasks such as multi-million triangle scene rendering, global illumination approximation, atmospheric scattering, and high-quality cascaded shadow mapping. All results were collected on an AMD Phenom™ X4 Quad-Core CPU system with 2 GB of RAM and an ATI Radeon™ 4870 graphics card with 512 MB of GDDR5 video memory and standard engine and memory clocks. The main bottleneck in this example was rendering a massive number of agents. In the case of simulating 65K agents, a simplified agent model (a cylinder) is used. Simulation (global and local) alone for 65K agents on the above system was 45 fps. Simulation of crowd behavior and interaction along with rendering for this large number of agents is 31 fps. Note that even with using a very simple cylinder model, due to extremely large number of agents, the GPU is rendering 9.8M triangles in the latter case. All of the testing results were collected rendered at HD resolution with 4×MSAA.

While the two crowd behavior simulation techniques were chosen for the global and local navigation, they also can be used separately as they each have their own advantages and disadvantages.

The continuum approach used for the global solver works well in the Froblins scenario where there are large numbers of agents with only a few types of goals. More complex scenarios with diverse tasks are likely to be incompatible with this type of approach. Another disadvantage of using a continuum approach is that all agents are modeled as having global knowledge. An agent will make navigation choices based on obstacles that are not visible to it, which may also not be desired. The continuum approach would be excellent for ambient crowds. That is, large groups of non-player characters which are present mostly for scenery but are expected to navigate around a dynamic environment or moving characters.

The local model also has disadvantages. By limiting local avoidance velocities to be of a clockwise nature, the variation in agent interaction is somewhat limited. Using a small discrete set of local directions for navigation can also lead to oscillation between two directions, creating distracting behavior. While the local avoidance model will prevent collisions in very densely packed situations, scenarios arise where agents can deadlock and will become stuck. This typically happens at sinks in agent navigations such as at a small goal. Once agents become densely packed around a goal, agents that reach the goal will be unable to navigate out of the goal area. This could be solved by incorporating varying levels of aggressive behavior into agent movement that causes agents to push each other out of the way. This type of approach could be augmented by a composite agent approach (see for example, Yeh, H., Curtis, S., Patil, S., van den Berg, J., Manocha, D., and Lin, M. 2008, Composite Agents, in the proceedings of ACM SIGGRAPH/Eurographics Symposium on Computer Animation 2008) to "trail-blaze" paths through densely packed agents.

In Harada et al. 2007a, which was discussed above, a sliced spatial data structure is used for point data on the GPU. This method employs a pre-pass over the point data to construct mapping functions that attempt to minimize wasted memory associated with unused cells in a uniform grid. A final stencil-routing step scatters the particles into cells within the grid and, thus, their method is related but orthogonal to our work. In the present embodiments, binning is a more efficient way to scatter point data into grid cells; the scattering step in Harada et al. 2007a would benefit from the herein disclose method of binning.

Further, unlike stencil routing, the embodiments do not require the input data to be in sorted order. Additionally, the disclosed method is more efficient because it removes points from the working set as they are binned and enables synchronization-free early termination once binning has completed.

A portion of the binning method disclosed herein makes use of a dual-depth test that was inspired by the depth peeling algorithm originally presented in [Mammen 1989] and later adapted for the GPU by Everitt [2001]. Depth peeling uses dual-depth tests to find the furthest fragment from the eye that is closer than all previous fragments at a pixel location, and was originally devised as a solution to order-independent transparency. On modern graphics hardware, the dual-depth test is performed by configuring the depth unit to perform one test and using one of the programmable stages to perform a second, complementary depth test. The method disclosed herein uses a similar dual-depth test to filter previously binned items during a given iteration.

Binning:—Sorting data into bins on the GPU is challenging for a number of reasons. Current graphics APIs do not allow generalized atomic writes, so updating a linked list or placing a data element at the end of an array is non-trivial. The construction must be made as efficient as possible because real-time, dynamic applications will have to reconstruct this data structure on every update (i.e., once every frame in a game). Querying the data structure must also be fast, since nearest-neighbor searches, one of our primary applications, will require multiple queries to gather all the binned elements near a particular point. The data structure itself will first be described, next described is how the data structure is queried, and finally a description of how the data structure is updated is provided.

As illustrated in FIG. 5, the binning method makes use of a 2D depth texture array 505 (which is also the depth texture array) and a single 2D color buffer to construct a data structure for storing items in bins. The color buffer is used to record the number of items in each bin (bin load). The depth texture array contains application-dependent key values that identify the binned items. A given 2D texel address in this array serves as a bin. A single bin, such as bin 507, 509, 511, 513, etc., is a set of texels which share the same 2D coordinates in successive texture array slices. The present binning method guarantees that items (also referred to as "obstacles," or "agents") are stored in bins, starting at the first slice of the array, in ascending order based on their key values. This fact may be useful for certain applications. For example, it can be exploited to perform a restricted form of bucket sort, as described below. Sorted bins also allow applications to employ binary search when looking for a particular item in a particular bin. For applications that do not need any particular ordering, simply binning the item IDs is sufficient.

Thus FIG. 5 illustrates the binning data structure of the embodiments. Points are mapped to texel locations on a grid. A bin counter keeps track of the number of points in each grid cell. Point IDs are stored in sorted order in successive slices of the bin array.

Queries:—Fetching items from a particular bin is very straightforward. The load on a particular bin is determined by reading the corresponding texel from the bin counter 503, and the i th element in the bin is read by fetching from slice i in the depth texture array (or agent ID array) 505. Applications can use bin load and dynamic flow control to ensure that only occupied slots in a particular bin are fetched.

Building the Data Structure:—To build the bin structure illustrated in FIG. 5, a series of rendering passes is performed in which point primitives are used to represent each item to be binned. The data that is to be placed into bins is referred to herein as the working set. As items are placed into bins, they are removed from the working set. A given bin can only receive one item per iteration, so the update process may require multiple passes before the working set is eliminated. In the limit, the method requires a number of rendering passes equal to the bin capacity.

Initially, the bin counters are cleared to 0 to indicate that the bins are all empty. All of the slices of the bin array are cleared to 1.0. During each pass, the vertex shader 203 determines which bin a particular item belongs in, and computes a corresponding pixel position for the point primitive. This effectively scatters the points into their corresponding bins. The point's depth value is set by mapping the key value onto (0,1). The rendering state is set such that the GPU's depth unit will pass fragments that are less than the depth value stored in the depth buffer.

For each binning iteration, the corresponding slice of the bin array is used as a depth buffer. In all iterations after the first, the slice used in the previous iteration is bound as a texture for input, and the vertex shader rejects the item if its depth value is greater than or equal to the value stored in the previous slice. Points can be marked as "rejected" by setting their depth value to some value outside of the valid depth range (for example, a rejected vertex could have its depth value set to −1.0). The depth unit remains configured to less than.

Much like depth peeling, we are effectively implementing a dual-depth buffer that causes the point with the lowest value that is greater than the previously binned value to pass. Performing the greater than or equal to test in the vertex shader rather than the pixel shader allows us to avoid inserting clip/kill instructions into our pixel shader and allows the GPU to use its early-Z culling hardware. This dual-depth test causes the first iteration to store the lowest keyed item in each bin, the second iteration to store the second lowest, etc. To compute the bin counts, the pixel shader simply writes the iteration number into the bin count texture (1 in the first pass, 2 in the second, and so on), causing it to be updated whenever an element is binned.

Predicated Iteration:—For situations in which the maximum bin load is low, it is possible that all the points will have been placed in bins before the binning algorithm has finished iterating. For example, if the maximum bin load is 2, then the binning algorithm can be terminated after 2 iterations. One way to detect that the working set has been eliminated is by using GPU queries to test whether any points pass the Z test (indicating that the working set is non-empty). Unfortunately, this kind of query would result in a CPU/GPU synchronization that would negatively impact performance.

The predicated rendering functionality provided by Direct3D 10 can be used to control the execution of the binning algorithm without introducing synchronization stalls. The draw calls for each iteration are predicated on the condition that the previous iteration resulted in items being scattered into bins. If no items are binned during a particular iteration, then we know that the working set has been eliminated and binning can safely terminate. Using cascaded predicated draw calls (each draw is predicated on the previous one) will result in the remaining draw calls being skipped. Thus, the GPU takes full responsibility for terminating the method.

Stream Reduction:—Using predicated iteration provides a performance gain by eliminating redundant rendering passes after all items have been binned. However, each pass still operates on the full data set, resulting in wasted processing for the items which that already been binned. This wasted work can be avoided by reducing the size of the point stream after each binning iteration, so the GPU only processes items that are still in the working set. This is easily implemented using geometry shaders.

To implement stream reduction, the point primitives are passed to a geometry shader that discards those points which have been flagged to indicate they failed the second-depth test, as described earlier. Points that pass the test are streamed into a buffer, which is used as input in subsequent iterations. This happens concurrently with rasterization and fixed-function depth testing. The Direct3D 10 call DrawAuto( ) can be used to submit the reduced working sets without querying how many items are in the working set, thus avoiding another source of CPU/GPU synchronization. Using this technique, points will be removed from the working set on the next iteration, after they have been binned. Note that no points can be removed from the working set during the first iteration, so stream output and second-depth testing should not be applied to it.

Handling Overflow:—An overflow condition occurs when the iteration count reaches or exceeds the bin array depth before the working set is eliminated. This can occur if too many items fall into a given bin. In practice, overflow often can be prevented by using a large enough number of bins (thus dividing the data set among many bins), or by simply increasing the bin capacity to accommodate the worst-case bin load.

Testing for overflow requires an additional iteration with a query to find the number of items that remain in the working set (recall that items are not removed from the working set until after they are binned). If any points pass the Z test during this final iteration, then overflow has occurred and must be dealt with accordingly. Depending on the application, it may be possible to stop iterating once the algorithm has reached the last bin array slice, process those items that have been binned, then continue to bin the remainder by wrapping around and rendering into the first slice of the bin array. Other applications may need to allocate a larger bin structure and simply try again.

Many applications require spatial binning Exemplary GPU implementations of three applications that benefit from spatial binning will now be described. Particle systems have been used in many games and films for many different kinds of effects. In a first application a GPU particle simulation uses binning for accelerating particle-to-particle interaction. In a second application, a method for path planning uses spatial binning to detect and avoid local collisions with other agents. A third application implements a restricted version of bucket sort using the binning method herein described.

Particle Systems: The DEM is used to simulate the behavior of particle systems both on the CPU [Bell et al. 2005.] as well as the GPU [Harada 2007]. Binning may be used to construct a spatial data structure to facilitate nearest neighbor searches when computing particle collision forces. Using a spatial hashing function, R3 is implicitly subdivided into an infinite uniform grid, which is used to map particle positions to bin addresses. Each particle searches its bin and neighboring bins for other particles. Setting the grid cell size to be approximately the diameter of a particle allows limiting the search to immediate neighbors while effectively limiting the maximum load on any particular bin. Particle-to-particle collisions are modeled using the spring and damping forces given by Equations C and D respectively [Harada et al. 2007a]. Collisions occur (and forces are computed) when the distance between two particles is less than the particle diameter, d.

If $x_i$ xi and $x_j$ are the positions of particles i and j with $v_i$ and $v_j$ denoting their velocities, then the relative position of particle j to particle i is:

$$r_{ij} = x_j - x_i \quad (A)$$

The force imparted on particle i when colliding with particle j is computed as follows:

$$f_{ij} = f_{ij}^{spring} + f_{ij}^{damp} \quad (B)$$

$$f_{ij}^{spring} = -k_s(d - |r_{ij}|)\frac{r_{ij}}{|r_{ij}|} \quad (C)$$

$$f_{ij}^{damp} = \eta(v_j - v_i) \quad (D)$$

Here, $k_s$ is the spring coefficient and $\eta$ is the damping coefficient. The total repulsive force, $f_i$, on particle i dues to collision from particles in its neighborhood, N (particles in i's bin and its immediate neighboring bins), is computed as:

$$f_i = \sum_{k \in N} f_{ik} \quad (E)$$

Agent Avoidance:—The binning method disclosed herein may also be used to conduct neighborhood searches for autonomous agents in a path-planning simulation. In this application, the simulation domain is of a known fixed size, so a uniform grid is appropriate. During path planning, each agent must conduct a search over the agents in its local neighborhood so it may alter its path to avoid collisions.

Each agent evaluates a number of fixed directions relative to the direction in which it wishes to move. Each direction is evaluated to determine the time to collision with nearby agents. Each direction is given a fitness function based on the angle relative to the desired direction and the time to collision. Time to collision is determined by evaluating a swept circle-circle collision test, in which the radius of each circle is equal to the radius of the bounding circle of the associated agent. The updated velocity (Equation H) is then calculated based on the direction with the highest fitness (Equation G) and the minimum time to collision in that direction.

$$\text{fitness}(d) = \omega_i t(d) + (g_i \cdot d) \cdot .5 + 5 \quad (F)$$

$$d_i = \underset{p_i \in V}{\text{argmax}} \; \text{fitness}(p_i) \quad (G)$$

$$v_i = d_i \min(s_a, s_a t(d_i)/\nabla ft) \quad (H)$$

$\omega_i$ wi is a per-agent factor affecting the preference to move in the global direction or avoid nearby agents, t(x) returns the minimum time-to-collision with all agents in direction x, V is the set of discrete directions to evaluate, $g_i$ is the preferred movement direction determined by a separate global path planner, $s_a$ is the speed of agent a, $\nabla ft$ is time-delta since the last simulation frame, and $v_i$ is the final velocity of agent i. This local avoidance method was previously described in [Shopf et al. 2008]. As shown in FIG. 6, each agent evaluates a fixed number of potential movement directions based on the positions and velocities of agents in its current and adjacent bins. Agents thereby move from goal to goal while avoiding local obstacles and each other.

Bucket Sort:—The binning method described herein can also be used to implement a restricted version of bucket sort. Because duplicate entries cannot be supported in the working set (they would fail the dual-depth test and be removed during the reduction phase), this kind of bucket sort implementation is limited to random arrays of unique values. It is also required that a loose upper and lower bound on the input values be known. If the input's distribution is known, this distribution may be used to partition the input domain such that the expected bin load is the same for all bins. If the distribution is not known, then the bounds are used to partition the input domain uniformly.

The binning algorithm is executed using the input data as the working set. When the binning method terminates, a final gathering pass is executed to collect the results. The gather pass takes a vertex buffer containing a single point for each bin. The bins are in ascending order in the vertex buffer such that the bin associated with the lowest partition of the input domain is first in the array. In the geometry shader, the associated bin's contents are fetched and are streamed out in ascending order. Because binning ensures that the data within a bin is in ascending order, no sorting need be performed in the geometry shader. The result of the gathering pass is an output buffer containing the input data sorted in ascending order.

Binning Performance:—The effect of stream reduction and predication optimizations were examined. Is was found that predication is an effective optimization, but also that stream reduction tends to be much more effective. It was also found that adding predication to stream reduction does not significantly change performance. This result is to be expected, since the predication merely skips draw calls which, because of stream reduction, would do no work to begin with.

While we found stream reduction to be generally effective, an interesting counter-example may occur. That is, if the number of bins is small, this implies that the average object count per bin (bin load) grows very quickly. As the bin load increases, fewer items are successfully binned during each pass, and the stream reduction gradually becomes less and less effective at eliminating work. Eventually, the extra bandwidth needed to repeatedly stream the active particles in and out of memory may begin to outweigh the performance gained by removing items from the working set. In contrast, the binning method does not need to repeatedly stream out its working set.

Such effect can be mitigated by simply delaying the start of stream reduction for a few iterations. With this modification, stream reduction is delayed until its eventual use will result in a large number of items being removed from the stream all at once, instead of removing them gradually and cycling the rest in and out of memory. This results in a significant performance improvement, compared to reducing on each iteration. This modification should not be applied blindly to all embodiments, as it may be harmful when the bin loads are low. A heuristic for choosing the number of iterations to be performed before reducing the working set will now be discussed.

The question of whether and how to delay stream reduction must be decided on a case-by-case basis, but the following provides some general guidelines. Test results have indicated that stream reduction is most effective when the average bin load is low, and when the fraction of occupied bins (bin spread) is high. A high spread causes more items to be removed from the working set in each pass, and a low load ensures that the removed items represent a larger percentage of the total. In high-load, low-spread situations (many particles going into a few bins), stream reduction is at a serious disadvantage, and a delay is most likely to be helpful. Delays may also be beneficial in high-load, high-spread situations (many particles going into many bins).

In experiments, the best results were obtained by delaying stream reduction until the number of iterations exceeds the expected bin load (which, for a uniform distribution, is equal to the particle count divided by the bin count).

Thus, a new method has been disclosed for sorting point data into spatial bins using graphics hardware with a standard graphics API. The disclosed method is more efficient than stencil routing because it reduces the working set as it iterates and stops iterating once it is done. Further, such binning can be implemented without introducing CPU/GPU synchronization.

Character LOD Management. The overarching goal of the system is simulation and rendering of massive crowds of characters with high level of detail. The latest generations of commodity GPUs demonstrate incredible increases in geometry performance, especially with the inclusion of GPU tessellation pipelines. Nevertheless, even with state-of-the-art graphics hardware, rendering multiple thousands of complex characters with high polygonal counts at interactive rates is very taxing. Rendering thousands of characters with over a million of polygons each is neither practical, nor wise, as in many cases these characters may be very small on the screen and therefore performance is wasted on the details that go unnoticed. For this reason it is essential to use culling and level of detail (LOD) techniques in order to make this rendering problem tractable.

Culling and LOD management have traditionally been CPU-centric tasks, trading a modest amount of CPU overhead for a much larger reduction in the GPU workload. However, a common difficulty arises when the positional data is generated by a GPU-based simulation, and, therefore, would require a costly read-back operation for CPU-side scene management.

An alternative is to use the available compute to perform all culling and scene management directly on the GPU. In the Froblins demo, this problem is solved by employing Direct3D® 10 geometry shaders in a novel way to perform character culling and LOD sorting entirely on the GPU. This enables us to perform these tasks efficiently for GPU-simulated characters. The underlying methods could also be applied with a CPU simulation, in order to offload the scene management from the CPU.

Using Stream-Out Operations as Filtering. The system takes advantage of instancing support available with Direct3D® 10 and Direct3D® 10.1 API. An army of characters are rendered as varied instanced characters, with individual actions and animations controlled on the GPU. Geometry shaders are used that act as filters for a set of character instances. A filtering shader works by taking a set of point primitives as input, where each point contains the per-instance data needed to render a given character (position, orientation, and animation state). The filtering shader re-emits only those points which pass a particular test, while discarding the rest. The emitted points are streamed into a buffer which can then be re-bound as instance data and used to render the characters. Multiple filtering passes can be chained together by using successive DrawAuto calls, and different tests can be set up simply by using different shaders.

In operation, a shared geometry shader is used to perform the actual filtering, and perform the different filtering tests in vertex shaders. Aside from providing more modular code, this approach can also provide performance benefits. The source to this filtering geometry shader is shown in Listing 1.

---

Listing 1. A stream-filtering geometry shader

---

```
struct GSInput
{
    // X,Y,Z contain the character's origin in world space
    // W contains a group number, which is used to vary character
      appearance
    float4 vPositionAndGroup    : PositionAndGroup;
    // X,Y contain the character orientation (a vector in the X/Z plane)
    // Z contains the index of the character's animation cycle
    // W contains the time along the cycle (see section 3.5)
    float4 vDirection           : DirectionStateAndTime;
    // Result of predicate test: 1 == emit, 0 == do not emit
    float fResult               : TestResult;
};
struct GSOutput
{
    float4 vPositionAndGroup    : PositionAndGroup;
    float4 vDirection           : DirectionStateAndTime;
};
[maxvertexcount(1) ]
void main ( point GSInput vert[1], inout PointStream<GSOutput>
outputStream )
{
    [branch]
    if( vert [0].fResult == 1 )
    {
        GSOutput o;
        o.vPositionAndGroup =   vert [0].vPositionAndGroup;
        o.vDirection =          vert [0].vDirection;
        outputStream.Append( o );
    }
}
```

---

View-Frustum Culling. It is straightforward to perform view frustum culling using a filtering geometry shader, as described above. For view-frustum culling, the vertex shader simply performs an intersection check between the character bounding volume and the view frustum, using the usual algorithms (for example, Akenine-Möeller, T., Haines, E. and Hoffman, N. 2008. Real-Time Rendering. 3rd ed. A. K. Peters, Ltd.). If the test passes, then the corresponding character is visible, and its instance data is emitted from the geometry shader and streamed out. Otherwise, it is discarded. An example of a culling vertex shader is given in Listing 2.

Listing 2. Vertex shader for view-frustum culling

```
struct VSInput
{
    float4 vPositionAndGroup : PositionAndGroup;
    float4 vDirectionStateAndTime : DirectionStateAndTime
};
struct VSOutput
{
    float4 vPositionAndGroup   : PositionAndGroup;
    float4 vDirection          : DirectionStateAndTime;
    float fVisible             : TestResult;
};
// Computes signed distance between a point and a plane
// vPlane; Contains plane coefficients (a,b,c,d) where: ax + by + cz = d
// vPoint: Point to be tested against the plane.
float DistanceToPlane( float4 vPlane, float3 vPoint )
{
    return dot( float4( vPoint, -1 ), vPlane );
}
// Frustum cullling on a sphere. Returns 1 if visible, 0 otherwise
float CullSphere( float4 vPlanes[6], float3 vCenter, float fRadius )
{
    for( uint i=0; i<6; i++ )
    {
        // entire sphere is outside one of the six planes, cull immediately
        if( DistanceToPlane( vPlanes[i], vCenter ) > fRadius )
            return 0;
    }
    return 1;
}
float4 vFrustumPlanes[6];    // view-frustum planes in world space (normals face out)
float3 vSphereCenter;        // bounding sphere center, relative to character origin
float fSphereRadius;         // bounding sphere radius
VSOutput VS( VSInput i )
{
    // compute bounding sphere center in world space
    float3 vObjectPosWS =      i.vPositionAndGroup.xyz;
    float3 vSphereCenterWS =   vBoundingSphereCenter.xyz + vObjectPosWS;
    // perform view-frustum test
    float fVisible = CullSphere( vFrustumPlanes, vSphereCenterWS, fSphereRadius );
    VSOutput o;
    o.vPositionAndGroup =      i.vPositionAndGroup;
    o.vDirectionStateAndTime = i.vDirectionStateAndTime;
    o.fVisible =               fVisible;
    return o;
}
```

Occlusion Culling. The system performs occlusion culling in this framework, to avoid rendering characters which are completely occluded by mountains or structures. Because character management is performed on the GPU, the GPU performs occlusion culling in a novel way, by taking advantage of the depth information that exists in the hardware Z buffer. This approach requires far less CPU overhead than an approach based on predicated rendering or occlusion queries, while still allowing culling against arbitrary, dynamic occluders. The approach is similar in spirit to the hierarchical Z testing that is implemented in modern GPUs, and was inspired by the work of, for example, Greene, N., Kass, M., and Miller, G. 1993. Hierarchical Z-buffer visibility, in SIGGRAPH '93: Proceedings of the 20th annual conference on Computer graphics and interactive techniques, ACM, New York, N.Y., USA, pp. 231-238, who used a hierarchical depth image combined with an octree to cull occluded geometry in bulk.

After rendering all of the occluders in the scene, a hierarchical depth image is constructed from the Z buffer, which is referred to as an Hi-Z map. The Hi-Z map is a mip-mapped, screen-resolution image, where each texel in mip level i contains the maximum depth of all corresponding texels in mip level i−1. In the most detailed mip level, each texel simply contains the corresponding depth value from the Z buffer. This depth information can be collected during the main rendering pass for the occluding objects; a separate depth pass is not required to build the Hi-Z map.

After construction of the Hi-Z map, occlusion culling can be performed by examining the depth information for pixels which are covered by an object's bounding sphere, and comparing the maximum fetched depth to the projected depth of a point on the sphere that is nearest to the camera. Although this approach does not provide an exact occlusion test, it gives a conservative estimate that works well in many cases, and will never result in false culling.

Hi-Z Map Construction. For single-sample rendering, one can use the Hi-Z map as the main depth buffer for rendering the scene (using a DepthStencil view of the first mip level). In Direct3D® 10.1, multi-sampled depth buffers can also be supported, with an extra full-screen quad pass, by first computing the maximum depth of each pixel's sub-samples and storing the result in the lowest level of the Hi-Z map.

Subsequent levels are generated using a sequence of reduction passes, which repeatedly fetch texels and compute their maximum, as shown in Listing 3. Because screen-sized images typically do not mip well, care must be taken when reducing odd-sized mip levels. In this case, the pixels on the odd-sized boundary edge must fetch additional texels to ensure that their depth values are taken into account. In addition, it is necessary to use integer calculations for the texture address arithmetic, because floating-point error can result in incorrect addressing when rendering into the lower mip levels.

Each of the reduction passes renders into one mip level of the Hi-Z map resource, while sampling from the previous one. This is valid approach in Direct3D® 10, as long as the resource view used for the input mip level does not overlap the one being used for output (different input and output views must be created for each pass).

The method includes the bounding square being computed in image space which fully encloses the character's projected bounding sphere. The method includes selecting a specific mip level in the Hi-Z map at which the square will cover no more than one 2×2 texel neighborhood. This 2×2 neighborhood is then fetched from the map, and the depth values are compared against the projected depth of a point on the bounding sphere that is nearest to the camera. The structure of the Hi-Z map guarantees that if any of these texels occludes the object, then all texels beneath it will also occlude. Although a 2×2 neighborhood has been chosen, a larger one could be used instead, and would provide more effective culling at the expense of added overhead in the culling test.

To obtain the closest point on the bounding sphere, the following formula can be used:

Listing 3. Pixel shader used for Hi-Z map construction

```
struct PSInput
{
    // Fractional pixel coordinates (0.5, 1,5, 2.5, etc...)
    float4 vPositionSS : SV POSITION;
    // Dimensions of 'tCurrentMip'.
    //   Can be obtained by calling 'GetDimensions' in the vertex shader.
    nointerpolation uint2 vLastMipSize : DIMENSION;
};
Texture2D<float> tCurrentMip;
sampler       sPoint;
float4 main( PSInput i ) : SV TARGET
{
    // get integer pixel coordinates
    uint3 nCoords =         uint3( i.vPositionSS.xy, 0 );
    uint2 vLastMipSize =    i.vLastMipSize;
    // fetch a 2x2 neighborhood and compute the max
    nCoords.xy *= 2;
    float 4 vTexels;
    vTexels.x = tCurrentMip.Load( nCoords );
    vTexels.y = tCurrentMip.Load( nCoords, uint2(1,0) );
    vTexels.z = tCurrentMip.Load( nCoords, uint2(0,1) );
    vTexels.w = tCurrentMip.Load( nCoords, uint2(1,1) );
    float fM = max( max( vTexels.x, vTexels.y ), max( vTexels.z,vTexels.w ) );
    // if we are reducing an odd-sized texture,
    // then the edge pixels need to fetch additional texels
    float2 vExtra;
    if( (vLastMipSize.x & 1) && nCoords.x == vLastMipSize.x-3 )
    {
        vExtra.x = tCurrentMip.Load( nCoords, uint2(2,0) );
        vExtra.y = tCurrentMip.Load( nCoords, uint2(2,1) );
        fM = max( fM, max( vExtra.x, vExtra.y ) );
    }
    if( (vLastMipSize.y & 1) && nCoords.y == vLastMipSize.y-3 )
    {
        vExtra.x = tCurrentMip.Load( nCoords, uint2(0,2) );
        vExtra.y = tCurrentMip.Load( nCoords, uint2(1,2) );
        fM = max( fM, max( vExtra.x, vExtra.y ) );
    }
    // extreme case: if both edges are odd, fetch the bottom-right corner texel
    if( ( ( vLastMipSize.x & 1 ) && ( vLastMipSize.y & 1 ) ) &&
        nCoords.x == vLastMipSize.x-3 && nCoords.y == vLastMipSize.y-3 )
    {
        fM = max( fM, tCurrentMip.Load( nCoords, uint2(2,2) ) );
    }
    return fM;
}
```

Culling with the Hi-Z Map. Once the Hi-Z map is constructed, another stream filtering pass is performed which uses this information to perform occlusion culling. In order to ensure a stable frame rate, it is desirable to restrict the number of fetches that are performed for each character, and to avoid divergent flow control between character instances. This can be accomplished by exploiting the hierarchical structure of the Hi-Z map.

$$P_v = C_v - \left(\frac{C_v}{|C_v|}\right) r \qquad (8)$$

Here, $P_v$ is the closest point in camera space, $C_v$ is the sphere center in camera space, and r is the sphere radius. The projected depth of this point will be used for the depth comparisons ahead. Note that if the camera is inside the bounding sphere, this formula will result in a point behind the near plane, whose projected depth is not well defined. In this case, the process refrains from culling the character to prevent a false occlusion.

To compute the character's bounding square, its projected height in screen space is calculated based on its distance from the image plane. Note that screen space is defined as the space obtained after perspective projection. The height in screen space is given by:

$$h = \frac{r}{d \tan\left(\frac{\theta}{2}\right)} \qquad (9)$$

where d is the distance from the sphere center to the image plane and $\Theta$ is the vertical field of view of the camera. The width of the bounding square is equal to this height divided by the aspect ratio of the back buffer. The size of the square in screen space is equal to twice its size in NDC space (which is a normalized space starting at the top-left corner of the screen). Note also that, for non-square resolutions, a square on the screen is actually a rectangle in screen space and NDC space.

When sampling the Hi-Z map, fetching occurs from the lowest level in which the bounding square covers at most four texels. This allows use of a fixed number of fetches to reject any square, no matter its size. To choose the level, the size of the square is smaller than the size of a single texel at the chosen resolution. In other words, the lowest level i is chosen such that:

$$\left(\frac{W}{2^i}\right) < 1 \qquad (10)$$

where the width of the rectangle in pixels is W. This yields the following equation for i:

$$i = \lceil \log_2(W) \rceil \qquad (11)$$

This holds, provided that the width of the rectangle in pixels is larger than the height. If this is not the case, the height in pixels should be used instead. This will happen whenever the aspect ratio is less than one.

Once the correct mip level is chosen, the process performs a texture fetch from the Hi-Z map at each corner of the bounding square, compute the maximum fetched value, and compares it with the depth of the depth of the point $P_v$.

HLSL code for occlusion culling is given in Listing 4. The vertex shader code shown in the listing is used together with a filtering geometry shader (Listing 1) to filter out character instances which are occluded by other scene elements. Remember that this calculation is only performed once per character, not once per rendered vertex.

LOD Selection. Given the above, LOD selection is also simple to implement. A discrete LOD scheme is used, in which a different level of detail is selected based on the distance from the camera to the character's center. This is implemented by using three successive filtering passes to separate the characters into three disjoint sets, based on their distances to the camera. These filtering passes are applied to the results of the culling steps, so that only visible characters are processed. The culling results are computed once, and re-used for the LOD selection passes. The characters in the finest (closest) LOD are rendered using hardware tessellation and displacement mapping, and the process uses conventional rendering for the middle LOD, and simplified geometry and pixel shaders for the furthest LOD.

Listing 4. Vertex shader for per-instance occlusion culling

```
float4x4  mV;                // Viewing transform
float4x4  mP;                // Projection transform
float3    vCameraPosition;   // Camera location in world space
float     fCameraFOV;        // Camera's vertical field of view angle
float     fCameraAspect;     // Camera aspect ratio
float4    vSphere;           // Bounding sphere center (XYZ) and radius (W), object space
float4    vViewport;         // X,Y,Width,Height
Texture2D<float>  tHiZMap;
sampler           sHiZPoint;
struct VSInput
{
    float4 vPositionAndGroup    : PositionAndGroup;
    float4 vDirection           : DirectionStateAndTime;
};
struct VSOutput
{
    float4 vPositionAndGroup    : PositionAndGroup;
    float4 vDirection           : DirectionStateAndTime;
    float  fVisible             : IsVisible;
};
VSOutput VS( VSInput i )
{
    VSOutput o;
    o.vPositionAndGroup = i.vPositionAndGroup;
    o.vDirection.xyzw =   i.vDirection.xyzw;
    o.fVisible =          1;
    // compute bounding sphere center in camera space
    float3 vAgentCenterWS = vSphere.xyz + i.vPositionAndGroup.xyz;
    float3 Cv = mul( mV, float4( vAgentCenterWS.xyz, 1 ) ).xyz;
    // Do not cull agents if the camera is inside their bounding sphere
    if( length( Cv ) > vSphere.w )
    {
        // compute nearest point to camera on sphere, and project it
        float3 Pv =          Cv - normalize( Cv ) * vSphere.w;
        float4 vPositionSS = mul( mP, float4(Pv,1) );
```

Listing 4. Vertex shader for per-instance occlusion culling

```
        // compute radii of bounding rectangle in screen space (2x the radii in NDC)
        float fRadiusY = vSphere.w / ( Cv.z * tan( fCameraFOV / 2 ) );
        float fRadiusX = fRadiusY / fCameraAspect;
        // compute UVs for corners of projected bounding square
        float2 vCornerNDC =    vPositionSS.xy / vPositionSS.w;
            vCornerNDC =      float2(0.5,-0.5)* vCornerNDC + float2( 0.5, 0.5 );
            vCornerNDC -=     0.5 * float2( fRadiusX, fRadiusY );
        float2 vCorner0 = vCornerNDC;
        float2 vCorner1 = vCornerNDC + float2( fRadiusX,    0 );
        float2 vCorner2 = vCornerNDC + float2( 0,           fRadiusY );
        float2 vCorner3 = vCornerNDC + float2( fRadiusX,    fRadiusY );
        // Choose a MIP level in the HiZ map (assume that width > height)
        float W =     fRadiusX * vViewport.z;
        float fLOD =  ceil( log2( W ) ) ;
        // fetch depth samples at the corners of the square to compare against
        float4 vSamples;
        vSamples.x = tHiZMap.SampleLevel( sHiZPoint, vCorner0, fLOD );
        vSamples.y = tHiZMap.SampleLevel( sHiZPoint, vCorner1, fLOD );
        vSamples.z = tHiZMap.SampleLevel( sHiZPoint, vCorner2, fLOD );
        vSamples.w = tHiZMap.SampleLevel( sHiZPoint, vCorner3, fLOD );
        float fMaxDepth = max( max( vSamples.x, vSamples.y ),
                               max( vSamples.z, vSamples.w ) );
        // cull agent if the agent depth is greater than the largest of our ZMap values
        o.fVisible = ( (vPositionSS.z / vPositionSS.w) > fMaxDepth ) ? 0 : 1;
    }
    return o;
}
```

Character Management System High Level Overview. The GPU character management system is illustrated in pseudo-code in Listing 5. The GPU system renders the occluding geometry and prepares the Hi-Z map. All characters are run through the view frustum culling filter, and stream out the ones which pass. The results of the view-frustum pass are then run through the occlusion culling filter using a DrawAuto call. The instances which pass the occlusion culling test are then run through a series of LOD selection filters to separate them by LOD.

Once the visible characters in each LOD are determined, all of the character instances in each given LOD are rendered. In order to issue the draw call for that LOD, the instance count must be known. Obtaining this instance count requires the use of a stream out statistics query. Like occlusion queries, stream out statistics queries can cause significant stalls, and, thus, performance degradation, when the results are used in the same frame that the query is issued, because the GPU may go idle while the game application is processing the query results. However, an easy solution for this is to re-order draw-calls to fill the gap between previous computations and the result of the query. In the system, the GPU stall is offset by interleaving scene management with the next frame's crowd movement simulation. This ensures that the GPU is kept busy while the CPU is reading the query result and issuing the character rendering commands.

Listing 5. Summary of the character management system

```
RenderOccluders( )
RenderHiZMap( )
// Do view-frustum culling
// streaming visible instances to 'frustumCullOutput' buffer
BindFrustumShader( )
IASetVertexBuffers( characterVB );
SOSetTargets( frustumCullOutput );
Draw( POINT_LIST, CHARACTER_COUNT );
// Do occlusion culling on frustum culling results
//   streaming visible instances to 'occlusionCullOutput' buffer
BindOcclusionShader( );
```

Listing 5. Summary of the character management system

```
IASetVertexBuffers( frustumCullOutput );
SOSetTargets( occulsionCullOutput );
DrawAuto( POINT_LIST ) // render output of frustum culling shader
// Filter occlusion culling results by LOD, and issue queries to read the
// final counts
IASetvertexBuffers( occlusionCullOutput ) ;
for(int i=0; i<LOD_COUNT; i++ )
{
    BindLODShader( LOD[i].minDistance, LOD[i].maxDistance );
    SOSetTargets( LOD [i].instanceDataBuffer ) ;
    LOD[i].query->Begin( )
    DrawAuto( POINT_LIST ); // render output of occlusion culling
    shader
    LOD[i].query->End( )
}
// if possible, do other CPU and GPU work here, to fill out the query stall
// read back character counts and render characters in each LOD
for( int i=0; i<LOD_COUNT; i++ )
{
    int instanceCount = LOD[i].query->GetPrimitiveCount( )
    DrawInstancedCharacter( LOD[i], instanceCount );
}
```

Character Animation. The traditional approach to rendering key framed, skinned characters is to sample the animations and compute a matrix palette on the CPU, which is then loaded into constant store for consumption by vertex shaders. This is generally done once per character. Although it is sometimes possible to pack the bones for multiple individuals into constant store, there are still serious limitations on the number of characters that can be handled using this approach, and large crowds of characters will still require numerous draw calls. Furthermore, since the GPU is being used to manage characters, the traditional approach to skinning is not feasible. Accordingly, the system moves the animation sampling onto the GPU.

Figures 7, 8:
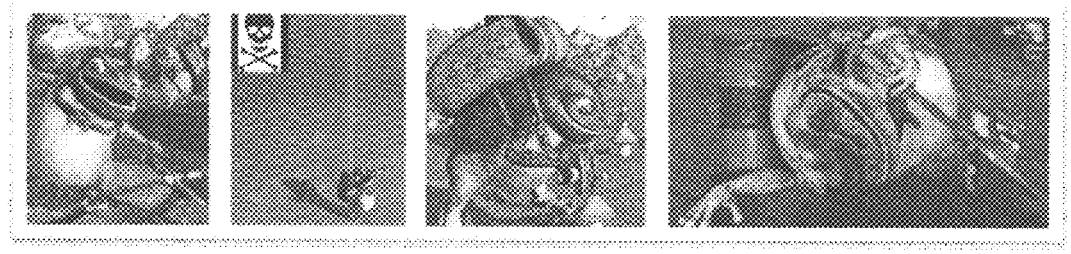
FIG. 7 illustrates one example of different actions that the Froblins can perform in accordance with an embodiment in the disclosure.
FIG. 8 illustrates one example of animation texture layout in accordance with an embodiment in the disclosure.

The agents can perform a set of predefined actions (walking, eating, mining, etc.,), some of which are demonstrated in FIG. 7. Each action has an associated animation sequence.

The system was close to 40 different animation sequences and transitions. During animation preprocessing, the transformation hierarchy is flattened and the system computes a bone transformation for each key frame that transforms that bone directly into object space. During the simulation, each character is assigned an animation sequence, and a time offset within that sequence. During character rendering, the vertex shader uses this information to fetch, interpolate, and blend the key frames for each bone. Each instanced character performs its skinning in object space, and then transforms the result according to its position and orientation.

FIG. 7 illustrates an example of different actions that the Froblins can perform. These actions are controlled by the character logic shader (i.e., code executing on the GPU), which also determines the current animation sequence based on each character's current state and desired action. From the left: (a) Froblin carrying his hard-earned treasure to the drop-off location; (b) User placed a noxious poison cloud in the path of Froblins and as a result they scatter away. Here the critter is seen running away from the hazard; (c) The Froblin is about to munch on some delicious mushrooms; (d) A bit of peaceful resting restores this Froblin's good spirits.

The layout of the animation data is illustrated in FIG. 8. The transformations are stored as 3×4 matrices. A texture array is used, where the horizontal and vertical dimensions correspond to key frame and bone index, and the slice number is used to index the animation sequence. Varying the time along one axis of the texture allows the use of the texture filtering hardware to interpolate between the key frames. Shader code to perform the animation fetch and blending is given in Listing 6. Per-vertex bone influences are sorted by weight, and use dynamic branching to avoid fetching zero-weight bones. This provides a notable performance gain in this particular example, as most vertices do not possess more than two bone influences.

FIG. 8. Animation texture layout. The amount of memory consumed by a full set of character animation data (in this example) is about 8 MB, which is a reasonable size for the particular application. Unfortunately, a large fraction of this is wasted space, which is incurred because the width of the texture must be large enough to accommodate the longest animation sequence. It may be desirable to use GPU-friendly sparse textures to store the animation data. Most of the animations are fairly short, with only a few long outliers in this example. This waste could be significantly reduced by simply packing multiple short animation sequences into one page of the texture array, and adding a lookup table to the shader which stores the start location for each sequence. Another, simpler solution might be to continue using one sequence per page, but to separate short and long sequences into separate arrays.

Listing 6. Shader code to fetch, interpolate, and blend bone animations

```
void SampleBone( uint nIndex, float fU, uint nSlice,
                 out float4 vRow1, out float4 vRow2, out float4 vRow3 )
{
    // compute vertical texture coordinate based on bone index
    float fV = (nIndices[0]) * (3.0f / fTexHeight);
    // compute offsets to texel centers in each row
    float fV0 = fV + ( 0.5f / fTexHeight );
    float fV1 = fV + ( 1.5f / fTexHeight );
    float fV2 = fV + ( 2.5f / fTexHeight );
    // fetch an interpolated value for each matrix row, and scale by bone weight
    vRow1 = fWeight * tBones.SampleLevel( sBones, float3( fU, fV0, nSlice ), 0 );
    vRow2 = fWeight * tBones.SampleLevel( sBones, float3( fU, fV1, nSlice ), 0 );
    vRow3 = fWeight * tBones.SampleLevel( sBones, float3( fU, fV1, nSlice ), 0 );
}
float3x4 GetSkinningMatrix( float4 vWeights, uint4 nIndices, float fTime, uint nSlice )
{
    // derive length of longest packed animation
    float fKeyCount =        fTexWidth;
    float fMaxCycleLength =  fKeyCount / SAMPLE FREQUENCY;
    // compute normalized time value within this cycle
    // if out of range, this will automatically wrap
    float fCycleLength = fCycleLengths[ nSlice ];
    float fU = frac( fTime / fCycleLength );
    // convert normalized time for this cycle into a texture coordinate for sampling.
    //   We need to scale by the ratio of this cycle's length to the longest,
    //       because the texture size is defined by the length of the longest cycle
    fU *= (fCycleLength / fMaxCycleLength);
    float4 vSum1, vSum2, vSum3;
    float4 vRow1, vRow2, vRow3;
    // first bone
    SampleBone( nIndices[0], fU, nSlice, vSum1, vSum2, vSum3 );
    vSum1 *= vWeights[0];
    vSum2 *= vWeights[0];
    vSum3 *= vWeights[0];
    // second bone
    SampleBone( nIndices[1], fU, nSlice, vRow1, vRow2, vRow3 );
    vSum1 += vWeights[1] * vRow1;
    vSum2 += vWeights[1] * vRow2;
    vSum3 += vWeights[1] * vRow3;
    // third bone
    if( vWeights[2] != 0 )
    {
        SampleBone( nIndices[2], fU, nSlice, vRow1, vRow2, vRow3 );
        vSum1 += vWeights[2] * vRow1;
        vSum2 += vWeights[2] * vRow2;
        vSum3 += vWeights[2] * vRow3;
```

Listing 6. Shader code to fetch, interpolate, and blend bone animations

```
    }
    // fourth bone
    if( vWeights [3] != 0 )
    {
        SampleBone( nIndices[3], fU, nSlice, vRow1, vRow2, vRow3 );
        vSum1 += vWeights[3] * vRow1;
        vSum2 += vWeights[3] * vRow2;
        vSum3 += vWeights[3] * vRow3;
    }
    return float3x4( vSum1, vSum2, vSum3);
}
```

Figure 9:
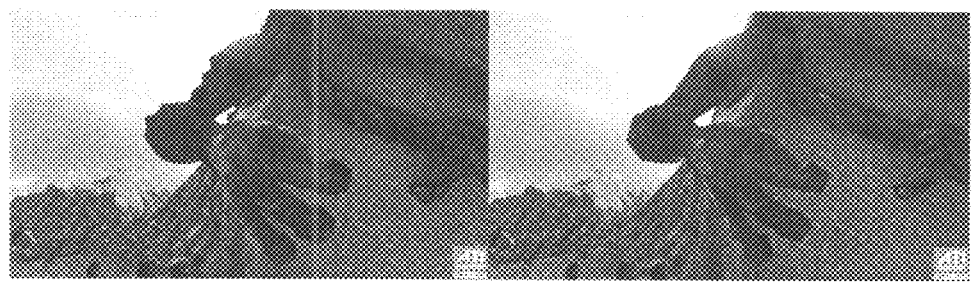
FIG. 9 illustrates one example of rendering characters with extreme details in close-up when using tessellation in accordance with an embodiment in the disclosure.

Tessellation and Crowd Rendering. As shown in FIG. 9, the system allows rendering characters with extreme details in close-up when using tessellation (left). On the right, the same character is rendered without the use of tessellation using identical pixel shaders and textures. While using the same memory footprint, The system is able to add high level of details for the tessellated character on the left, whereas the low resolution character has much coarser silhouettes.

Recent generations of GPU architecture such as Xbox® 360 and ATI Radeon® HD 2000, 3000 and 4000 series have shown tremendous improvements in geometry processing. These include unified shader architecture (introduced with Xbox® 360), increased number of dedicated shader units, and hardware tessellation pipeline. Furthermore, with the introduction of upcoming graphics APIs such as Direct3D® 11 (as described in Klein, A. 2008, Introduction to the Direct3D® 11 Graphics Pipeline. Presentation. Gamefest 2008, Seattle, Wash., July 2008 and Gee, K. 2008, Direct3D® 11 Tessellation. Presentation, Gamefest 2008, Seattle, Wash., July 2008), tessellation and displacement mapping will be universally supported across all hardware platforms designed for that generation and, thus, solidify tessellation as the first-class citizen feature in the real-time domain. Next generation games, including those authored for Xbox® 360 will use tessellation for extreme visual impact, high quality, and stable performance. A strong understanding of how this technology works is the key to quick and successful adoption.

TABLE 1

Comparison of memory footprint for high and low resolution models for the main character.

| | Polygons | Total Memory |
|---|---|---|
| Froblin control cage, Low resolution model | 5,160 faces | Vertex and index buffers: 100 KB<br>2K × 2K 16 bit displacement map: 10 MB |
| Zbrush ® high resolution Froblin model | 15+ M faces | Vertex buffer: ~270 MB<br>Index Buffer: 180 MB |

Figure 10:
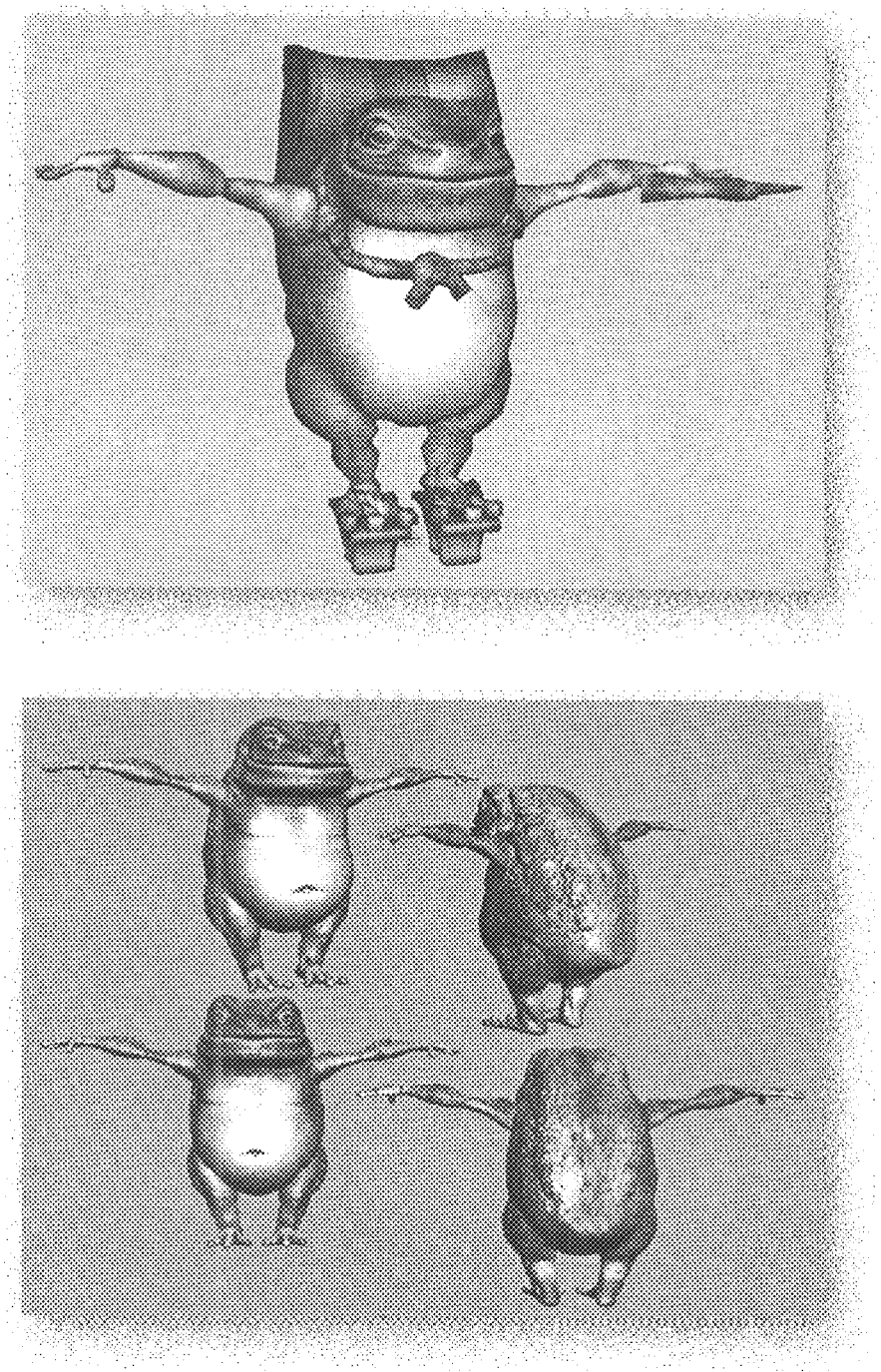
FIG. 10 illustrates one example of comparison of low resolution model and high resolution model in accordance with an embodiment in the disclosure.

FIG. 10 illustrates a comparison of low resolution model (top) and high resolution model (bottom) for the Froblin character. Hardware tessellation provides several key benefits specifically crucial for interactive systems, such as video games. One of the main advantages is effective compression of vertex data. When using tessellation, the surface topology, parameterization and animation data is specified for the coarse control mesh. This mesh is authored to have low amount of detail, and just to capture the overall shape of the desired object. The system then combines rendering of this control cage with GPU tessellation and displacement mapping to greatly increase the overall amount of details. High frequency details such as wrinkles, bumps and dents are captured by the displacement map. FIG. 10 shows an example of this for one character. Thus using tessellation can reduce memory footprint and bandwidth. This is true both for on-disk storage and for system and video memory footprint, thus reducing the overall game distribution size, improving loading time. The memory savings are especially relevant for console developers, where memory resources are scarce. Table 1 demonstrates memory savings for the main character, the Froblin. Additional overview of the benefits provided by tessellation can be found in Tatarchuk, N. 2008, Advanced Topics in GPU Tessellation: Algorithms and Lessons Learned, Presentation, Gamefest 2008, Seattle, Wash., July 2008.

GPU Tessellation Pipeline. This section provides an overview of GPU tessellation pipeline available on current consumer hardware, as used in the system. An API for a GPU tessellation pipeline takes advantage of hardware fixed-function tessellator unit available on recent consumer GPUs. The tessellation process is outlined in FIG. 11.

Figure 11:
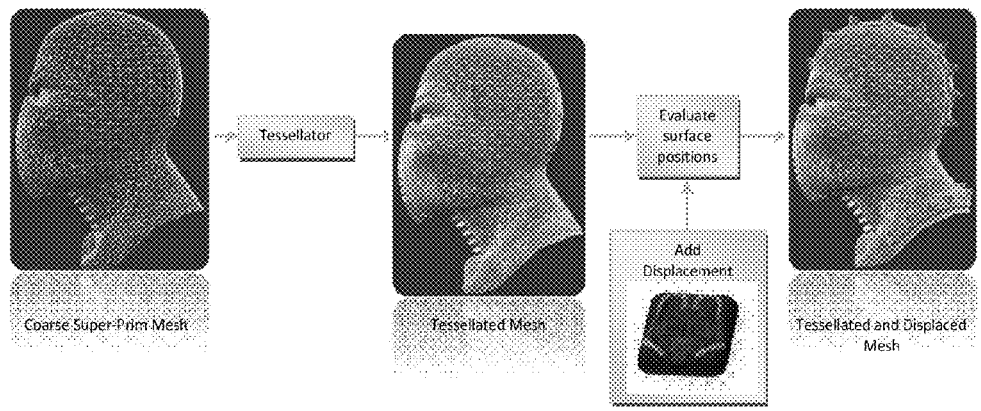
FIG. 11 illustrates one example of an overview of the tessellation process in accordance with an embodiment in the disclosure.

FIG. 11 illustrates an overview of the tessellation process. The process starts by rendering a coarse, low resolution mesh (also referred to as the "control cage" or "the super-primitive mesh"). The tessellator unit of the GPU generates new vertices, thus amplifying the input mesh. The vertex shader is used to evaluate surface positions and add displacement, obtaining the final tessellated and displaced high resolution mesh seen on the right.

Going through the process for a single input polygon, the hardware tessellator unit takes an input primitive (referred to as a super-primitive), and amplifies it (up to 411 triangles, or 15× times for Xbox® 360 or ATI Radeon® HD 2000-4000 GPU generations, or 64× for Direct3D® 11 generation of graphics cards). A vertex shader (which is referred to as an evaluation shader) is invoked for each tessellated vertex and is provided with the vertex indices of the super-primitive, and the barycentric coordinates of the vertex. The evaluation shader uses this information to calculate the position of the tessellated vertex, using whatever technique it wishes. The level of tessellation can be controlled either by a per-draw call tessellation factor, or by providing per-edge tessellation factors in a vertex buffer for each triangle edge in the input mesh. Tatarchuk, N. 2008, Advanced Topics in GPU Tessellation: Algorithms and Lessons Learned, Presentation, Gamefest 2008, Seattle, Wash., July 2008 provides more details about the specific capabilities of the GPU tessellation on current and future hardware.

Rendering Characters with Interpolative Tessellation. Interpolative planar subdivision with displacement is used to efficiently render highly detailed characters. The tessellation level is specified, controlling the amount of amplification, per draw-call. Therefore, tessellation is used to control how fine the character's mesh is subdivided. The information about character location is used on the screen or other factors to control the desired amount of details. Furthermore, the same art assets for rendering the tessellated character can be used as for the regular, conventional rendering used in current games.

Combining tessellation with instancing allows rendering of diverse crowds of characters with minimal memory footprint and bandwidth utilization. By storing only a low-resolution model (5.2K triangles), and applying a displacement map in the evaluation shader, the system can render a detail-rich, 1.6M triangle character using very little memory. Also limiting per-vertex animation computations to the original mesh can be accomplished, since the system only needs to store animation data for the control cage of the character. GPU tessellation allows providing the data to GPU at coarse resolution, while rendering with high levels of detail. Listing 7 provides an example of the vertex shader code used for evaluating the resulting surface positions.

Listing 7. Example simple evaluation shader for rendering instanced tessellated characters.

```
struct VSInput
{
    float3 vPositionOS_vert0     : POSITION0;
    float3 vNormalOS_vert0       : NORMAL0;
    float3 vTangentOS_vert0      : TANGENT0;
    float3 vBinormalOS_vert0     : BINORMAL0;
    float2 vUV_vert0             : TEXCOORD0;
    float3 vPositionOS_vert1     : POSITION1;
    float3 vNormalOS_vert1       : NORMAL1;
    float3 vTangentOS_vert1      : TANGENT1;
    float3 vBinormalOS_vert1     : BINORMAL1;
    float2 vUV_vert1             : TEXCOORD1;
    float3 vPositionOS_vert2     : POSITION2;
    float3 vNormalOS_vert2       : NORMAL2;
    float3 vTangentOS_vert2      : TANGENT2;
    float3 vBinormalOS_vert2     : BINORMAL2;
    float2 vUV_vert2             : TEXCOORD2;
    float3 vInstancePosWS : WSInstancePosition; // This is per-instance data
    float3 vBarycentric: TessCoordinates;// Tessellation-specific system-generated values
};
struct VSOutput
{
    float3 vNormalWS     : Normal;
    float3 vTangentWS    : Tangent;
    float3 vBinormalWS   : Binormal;
    float2 vUV           : TEXCOORD0;
    float  fGroup        : GroupID;
    float4 vPositionWS   : Position;
    float4 vPositionSS   : SV_POSITION;
};
float4x4         mVP;
Texture2D<float> tDisplacement;
SamplerState     sPointClamp;
SamplerState     sBaseLinear;
float            fDisplacementScale;
float            fDisplacementBias;
VSOutput VS( VSInput i )
{
    VSOutput o;
    //Interpolated tessellated vertex:................................................
    float3 vPositionOS =    i.vPositionOS_vert0    * i.vBarycentric.x +
                            i.vPositionOS_vert1    * i.vBarycentric.y +
                            i.vPositionOS_vert2    * i.vBarycentric.z;
    float3 vNormalOS =      i.vNormalOS_vert0      * i.vBarycentric.x +
                            i.vNormalOS_vert1      * i.vBarycentric.y +
                            i.vNormalOS_vert2      * i.vBarycentric.z;
    float3 vTangentOS =     i.vTangentOS_vert0     * i.vBarycentric.x +
                            i.vTangentOS_vert1     * i.vBarycentric.y +
                            i.vTangentOS_vert2     * i.vBarycentric.z;
    float3 vBinormalOS =    i.vBinormalOS_vert0    * i.vBarycentric.x +
                            i.vBinormalOS_vert1    * i.vBarycentric.y +
                            i.vBinormalOS_vert2    * i.vBarycentric.z;
    // Interpolated texture coordinates;
    o.vUV = i.vUV_vert0 * i.vBarycentric.x + i.vUV_vert1 * i.vBarycentric.y +
            i.vUV_vert2 * i.vBarycentric.z;
    // Displace vertex by object's displacement map
    float fDisplacement = tDisplacement.SampleLevel( sPointClamp, o.vUV, 0 ).r;
        fDisplacement = fDisplacement * fDisplacementScale + fDisplacementBias;
    vPositionOS = vPositionOS + fDisplacement * vNormalOS;
    // Convert position and tangent frame from object space to world space by rotating and
    // translating because we are always rotating about y, we can simplify the math
    // somewhat for extra perf
    float3 vPositionWS =    Rotate2D( vDir, vPositionOS ) + vInstancePosWS;
    float3 vNormalWS =      Rotate2D( vDir, vNormalOS );
    float3 vTangentWS =     Rotate2D( vDir, vTangentOS );
    float3 vBinormalWS =    Rotate2D( vDir, vBinormalOS );
```

Listing 7. Example simple evaluation shader for
rendering instanced tessellated characters.

```
    o.vPositionSS =   mul( mVP, float4( vPositionWS, 1 ) );
    o.vPositionWS =   float4( vPositionWS, 1 );
    o.vNormalWS =     vNormalWS;
    o.vTangentWS =    vTangentWS;
    o.vBinormalWS =   vBinormalWS;
    return o;
}
```

Given that the character is rendered with a displacement map—a note about lighting. Traditionally, animated characters are rendered and lit using tangent-space normal maps (TSNM). However, there exists a concern with regards to using displacement mapping when lighting using tangent-space normal maps. In that case, the system essentially generates a new tangent frame as the system is displacing, changing the actual displaced normal (as shown in FIG. 12).

Figure 12:
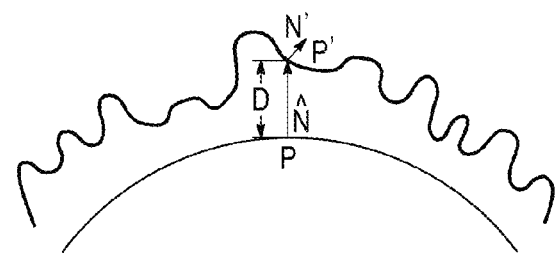
FIG. 12 illustrates one example of displacement of the vertex modifies the normal used for rendering in accordance with an embodiment in the disclosure.

FIG. 12 illustrates displacement of the vertex modifies the normal used for rendering. P is the original point displaced in the direction of geometric normal $\hat{N}$ displacement amount D. The resulting point P' needs to be shaded using normal N'.

However, lighting the displaced surface is done using tangent space normal map, using the encoded normals. In order to combine TSNM with displacement mapping, several constraints need to be met. Namely, that the system computes tangent space during rendering in the same exact manner as was used to generate the displacement and normal maps, and that the generation process for displacement and normal maps also used identical tangent space and models. In other words, ideally, the displacement map must be generated at the same time as the normal map. In that case, the normal encoded in the tangent-space normal map, would match the desired normal N'. By using publicly available AMD GPUMeshMapper tool which provides source code for tangent-space generation, these requirements can be met.

Tessellated Characters Level of Detail Control. In the Froblins demo, a three-level static LOD scheme is used, as discussed above. Tessellation and displacement mapping are applied only to the characters in the most detailed level. In order to guarantee a stable frame rate in dense crowd situations, the tessellation level is computed as a function of the number of tessellated characters. This is effective in avoiding a polygonal count explosion and retains the performance benefits of geometry instancing. The tessellation level is set as follows:

$$T = \text{clamp}\left(\frac{2T_{max}}{N}, 1, T_{max}\right)$$

Here, T is the tessellation level to be used for character instances in the first detail level, N is the number of character instances in the first detail level, and $T_{max}$ is the maximum tessellation level to use for a single character. This scheme effectively bounds the number of triangles created by the tessellator, and ensures that the primitive count will never increase by more than the cost of two fully tessellated characters. If there are more than two such characters in the view frustum, this scheme will divide the tessellated triangles evenly among them. Naturally, this can lead to popping as the size of the crowd changes dramatically from one frame to the next, but in a lively scene with numerous animated characters, this popping is hard to perceive.

Rendering Optimizations. Because hardware tessellation can generate millions of additional triangles, it is essential to minimize the amount of per-vertex computation. The character vertex shaders already use a fairly expensive technique for skinned animation on the GPU, and performing these animation calculations inside the evaluation shader can be wasteful.

The performance can be improved with a multi-pass approach for rendering out animated characters. The control cage pre-pass is computed, all relevant computations for the original low resolution mesh, such as animation and vertex transformations can be computed. This method is general and takes advantage of Direct3D® 10 stream out functionality. Note that in order to reduce the amount of memory being streamed out per character, as well as reduce vertex fetch and vertex cache reuse for the evaluation shader, the control cage multi-pass method is augmented with vertex compression and decompression described below. Note that using this multi-pass method for control cage rendering is beneficial not only for rendering tessellated characters, but for any rendering pipeline where it is desired to reuse results of expensive vertex operations multiple times. For example, the results of the first pass for the animated and transformed characters can be used for rendering into shadow maps and cube maps for reflections.

The skinning calculations are only performed once per character, on the super-primitive vertices, and the results are simply interpolated from the super-primitives by the evaluation shader. In the first pass, all of the character vertices are rendered as an instanced set of point primitives, skinning is performed on them (as described above), and stream out the results into a buffer. In the second (tessellated) pass, the instance ID and super-primitive vertex IDs are used by the evaluation shader to fetch the transformed vertex data, interpolate a new vertex, and apply displacement mapping. Note that the only quantities that need to be output in the first pass are quantities affected by the transformations (such as vertex positions and normals, but not the texture coordinates or vertex colors, for example).

Although it is helpful to stream and re-use the skinning calculations, this alone is not very effective, because the vertex data will be streamed at full precision, and the evaluation shader must still pay a large cost in memory bandwidth and fetch instructions in order to retrieve it. Additionally, sufficient stream out buffer needs to be allocated to store transformed vertices. A compression scheme is used to pack the transformed vertices into a compact 128-bit format in order to remove this bottleneck and to reduce the associated memory footprint. This allows the tessellation pass to load a full set of transformed vertex data using a single fetch per super-primitive vertex. Although the compression scheme requires additional ALU cycles in the GPU for both compression and decompression, this is more than paid for by the reduction in memory bandwidth and fetch operations in the evaluation shader.

Vertex positions are compressed by expressing them as fixed-point values which are used to interpolate the corners of a sufficiently large bounding box which is local to each character. The number of bits needed depends on the size of the model and the desired quality level, but it does not need to be extremely large. In the example above, the dynamic range of the vertex data is roughly 600 cm. A 16-bit coordinate on this scale gives a resolution of about 90 microns, which is slightly larger than the diameter of a human hair.

The tangent frame can be compressed by converting the basis vectors to spherical coordinates and quantizing them. Spherical coordinates are well suited to normal compression since every compressed value in the spherical domain corresponds to a unique unit-length vector. In a Cartesian representation (such as the widely used DEC3N format), a large fraction of the space of compressed values will go unused. What this means in practice is that a much smaller bit count can be used to represent spherical coordinates at a reasonable level of accuracy. It has been found that using an 8-bit spherical coordinate pair for normals results in rendered images that are comparable in quality to a 32-bit Cartesian format. The main drawback of using spherical coordinates is that a number of expensive trigonometric functions must be used for compression and decompression, but it has been found that the benefits of a small compressed format outweigh the additional ALU cost on current graphics hardware.

Texture coordinates are compressed by converting the UV coordinates into a pair of fixed-point values, using whatever bits are left. In order to ensure acceptable precision, this requires that the UV coordinates in the model be confined to the 0-1 range, with no explicit tiling of textures by the artist. For small textures, a smaller bit count could be used for the UV coordinates, provided that the UVs are snapped to the texel centers.

Figure 13:
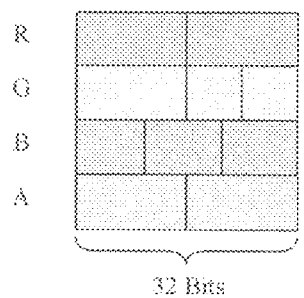
FIG. 13 illustrates one example of data format used for compressed, animated vertices in accordance with an embodiment in the disclosure.

Data format used for compressed, animated vertices. The bit layout for the compressed vertices is shown in FIG. 13, and corresponding compression and decompression code is shown in Listings 8 and 9. Sixteen bits are used for each component of the position, two 8-bit spherical coordinates for the tangent, 32 bits for the normal, and 16 for each UV coordinate. Since the tangent frames are orthogonal, the system refrains from storing the binormal, and instead re-computes it based on the decompressed normal and tangent. Since a full 32-bit field is available, a DEC3N-like compression is used for the normal, which requires fewer ALU operations than spherical coordinates. If additional data fields are needed, 8-bit spherical coordinates can be used for the normal, at a quality level comparable to DEC3N.

The compressed format used here would also make an excellent storage format for static geometry. In this case, (and also for the case of non-instanced characters) the decompression could be accelerated by leveraging the vertex fetch hardware to perform some of the integer to float conversions. Due to quantization used for compression, there are subtle differences between the two images due to compression. However, these artifacts are difficult to notice in a dense, dynamic crowd of animated characters, and even difficult to discern in static comparison screenshots.

Listing 8. Compression code for vertex format given in FIG. 13.

```
// Quantizes a floating point value (0-1) to a certain number of bits
uint Quantize( float v, uint nBits )
{
    float fMax = ((float) (1 << nBits) )-1.0f;
    return uint( round(v*fMax) );
}
uint PackShorts( uint nHigh, uint nLow )
{
    return (nHigh << 16) | (nLow);
}
uint PackBytes( uint nHigh, uint nLow )
{
    return (nHigh << 8) | (nLow) ;
}
/// Converts a vector to spherical coordinates.
/// Theta (x) is in the 0-PI range. Phi (y) is in the -PI,PI range
float2 CartesianToSpherical( float3 cartesian )
{
    cartesian = clamp( normalize( cartesian ), -1,1 ); // beware of rounding error
    float theta =   acos( cartesian.z ) ;
    float s =       sqrt( cartesian.x * cartesian.x + cartesian.y * cartesian.y );
    float phi =     atan2( cartesian. x / s, cartesian.y / s );
    if( s == 0 )
        phi = 0; // prevent singularity if normal points straight up
    return float2( theta, phi ) ;
}
// Converts a normal vector to quantized spherical coordinates
uint2 CompressVectorQSC( float3 v, uint nBits )
{
    float2 vSpherical = CartesianToSpherical( v );
    return uint2( Quantize( vSphericalNorm.x / PI, nBits ),
                  Quantize( (vSphericalNorm.y + PI ) / ( 2*PI ), nBits ) );
}
// Encodes position as fixed-point lerp factors between AABB corners
uint3 CompressPosition( float3 vPos, float3 vBBMin, float3 vBBMax, uint nBits )
{
    float3 vPosNorm = saturate( (vPos - vBBMin) / (vBBMax-vBBMin) );
    return uint3( Quantize( vPosNorm.x, nBits ),
                  Quantize( vPosNorm.y, nBits ),
                  Quantize( vPosNorm.z, nBits ) );
}
```

| Listing 8. Compression code for vertex format given in FIG. 13. |
|---|

```
uint PackCartesian( float3 v )
{
    float3 vUnsigned = saturate( (v.xyz * 0.5) + 0.5 );
    uint nX = Quantize( vUnsigned.x, 10 );
    uint nY = Quantize( vUnsigned.y, 11 );
    uint nZ = Quantize( vUnsigned.z, 11 );
    return ( nX << 22 ) | ( nY << 11 ) | nZ;
}
uint4 PackVertex( CompressedVertex v, float3 vBBoxMin, float3 vBBoxMax )
{
    uint3 nPosition = CompressPosition( v.vPosition, vBBoxMin, vBBoxMax, 16 );
    uint2 nTangent = CompressVectorQSC( v.vTangent, 8 );
    uint4 nOutput;
    nOutput.x = PackShorts( nPosition.x, nPosition.y );
    nOutput.y = PackShorts( nPosition.z, PackBytes( nTangent.x, nTangent.y ) );
    nOutput.z = PackCartesian ( v.vNormal );
    nOutput.w = PackShorts( Quantize( vUV.x, 16 ), Quantize( vUV.y, 16 ) );
    return nOutput;
}
```

| Listing 9. Decompression code for vertex format given in FIG. 13 |
|---|

```
float DeQuantize( uint n, uint nBits )
{
    float fMax = ((float) (1 << nBits)) – 1.0f;
    return float(n)/fMax;
}
float3 DecompressVectorQSC( uint2 nCompressed, uint nBitCount )
{
    float2 vSph = float2( DeQuantize( nCompressed.x, nBitCount ),
                         DeQuantize( nCompressed.y, nBitCount ) );
    vSph.x = vSph.x * PI;
    vSph.y = (2 * PI * vSph.y) – PI
    float fSinTheta =   sin( vSph.x );
    float fCosTheta =   cos( vSph.x );
    float fSinPhi =     sin( vSph.y );
    float fCosPhi =     cos( vSph.y );
    return float3( fSinPhi * fSinTheta, fCosPhi * fSinTheta, fCosTheta );
}
float3 DecompressPosition( uint3 nBits, float3 vBBMin, float3 vBBMax, uint nCount )
{
    float3 vPosN = float3( DeQuantize( nBits.x, nCount),
                          DeQuantize( nBits.y, nCount),
                          DeQuantize( nBits.z, nCount) );
    return lerp( vBBMin.xyz, vBBMax.xyz, vPosN );
}
float3 UnpackPosition( uint4 nPacked, float3 vBBoxMin, float3 vBBoxMax )
{
    uint3 nPos;
    nPos.xy = uint2( nPacked.x >> 16, nPacked.x & 0x0000ffff );
    nPos.z = nPacked.y >> 16;
    return DecompressPosition( nPos, vBBoxMin, vBBoxMax, 16 );
}
float2 UnpackUV( uint4 nPacked )
{
    uint2 nUV = uint2( nPacked.w >> 16, nPacked.w & 0x0000ffff );
    float2 vUV = float2( DeQuantize( nUV.x, 16 ), DeQuantize( nUV.y, 16 ) );
    return vUV;
}
float3 UnpackTangent( uint4 nPacked )
{
    uint2 nTan = uint2( (nPacked.y >> 8) & 0xff, nPacked.y & 0xff );
    return DecompressVectorQSC( nTan, 8 );
}
float3 UnpackCartesian( uint n )
{
    uint nX = (n >> 22)   & 0x3FF;
    uint nY = (n >> 11)   & 0x7FF;
    uint nZ = n           & 0x7FF;
    float fX = (2.0f * DeQuantize( nX, 10 )) – 1.0f;
    float fY = (2.0f * DeQuantize( nY, 11 )) – 1.0f;
    float fZ = (2.0f * DeQuantize( nZ, 11 )) – 1.0f;
    return float3( fX, fY, fZ );
}
```

| Listing 9. Decompression code for vertex format given in FIG. 13 |
| --- |

```
CompressedVertex UnpackVertex( uint4 nPacked, float3 vBBoxMin, float3 vBBoxMax )
{
    CompressedVertex vVert;
    vVert.vPosition =    UnpackPosition( nPacked, vBBoxMin, vBBoxMax );
    vVert.vNormal =      UnpackCartesian( nPacked.z );
    vVert.vTangent =     UnpackTangent( nPacked );
    vVert.vBinormal =    normalize( cross( vVert.vTangent; vVert.vNormal ) );
    vVert.vUV =          UnpackUV( nPacked );
    return vVert;
}
```

Displacement Map Tips and Ensuring Watertightness. There are several practical tips for generation and use of displacement maps. Firstly, the method used for generation of displacement maps must match the method for evaluating subdivided surface. This naturally correlates to the absolute need to know the process used by the modeling tool used for map generations. Many DCC tools such as Autodesk Maya® will first use approximating subdivision process, such as Catmull-Clark subdivision method, on the control mesh (the low resolution, or super-primitive, mesh). Once the mesh has been smoothed, then the fine-scale details are captured into a scalar or vector displacement map. When using these tools, the final surface must be evaluated using Catmull-Clark subdivision methods. However, the evaluation shaders are reasonably expensive, which may favor using interpolative planar subdivision due to its extreme simplicity for evaluation. Additionally a number of concerns arise with topology fix-up and treatment of extraordinary points, as well as patch reordering to ensure watertightness during displacement. However, should the interested reader may wish to investigate further about using GPU tessellation for Catmull-Clark surfaces, they can find additional material and further references in Tatarchuk, N. 2008, Advanced Topics in GPU Tessellation: Algorithms and Lessons Learned, Presentation, Gamefest 2008, Seattle, Wash., July 2008.

In the above case, the AMD GPUMeshMapper tool (for example, AMD GPUMeshMapper 2008) was used, designed specifically for robust generation of displacement maps for interpolative planar subdivision. Specifically, given a pair of low and high resolution meshes, this tool provides a number of different options for controlling the envelopes for ray casting from low to high resolution map in order to capture displacement and normal information. Furthermore, in order to achieve controllable results at run-time, the exact floating point values must be known for displacement scale and bias for the generated displacement map. This tool provides this information, collected during the generation process, in the form of parameters which can be used directly in the shader.

Figure 14:
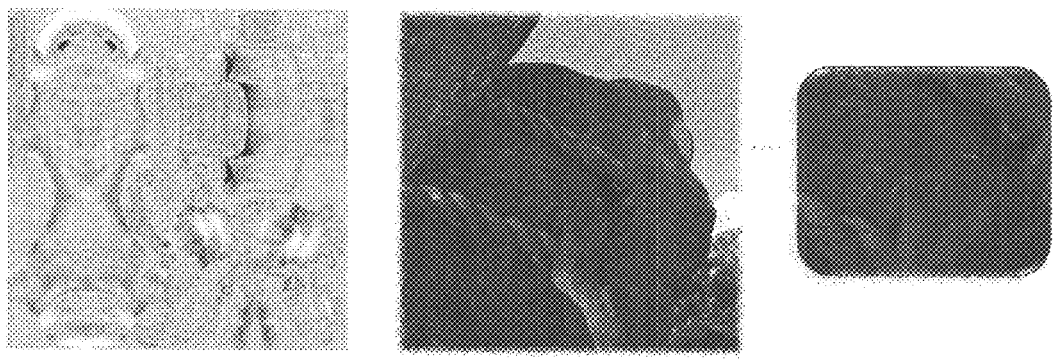
FIG. 14 illustrates one example of a visible crack generated due to inconsistent values across the edges of displacement map for this character in accordance with an embodiment in the disclosure.

Particular care needs to be paid during displacement mapping in order to generate resulting watertight surfaces. This is true regardless of the subdivision method used for evaluation. One challenge with rendering complex characters with displacement maps that contain texture uv borders is the introduction of texture uv seams (see FIG. 14 for an example of such a displacement map). Unless neighboring uv borders are laid out with the same orientations and lengths, displacing with these maps will introduce geometry cracks along the uv borders (FIG. 14). This happens due to bilinear discontinuities and to varying floating point precision on different regions of the texture map. Seamless parameterizations remove bilinear artifacts, but do not solve floating point precision issues. One-to-one parameterization is extremely difficult to obtain for complex characters, if not impossible in practical scenarios. The problem is solved during the map generation process, rather than at run-time, via additional features implemented as part of the GPUMeshMapper tool. The displacement maps are post-processed by correcting all the texture uv borders during the displacement map generation, by identifying the border triangle edges and performing filtering across edges (with additional fix-up) to alleviate displacement seams.

FIG. 14 illustrates an example of a visible crack generated due to inconsistent values across the edges of displacement map for this character. On the left the specific edges along the seam are highlighted. Note that the adjacent edges for this seam do not have uniform parameterization.

Lighting and Shadowing—Rendering Shadows in Large Scale Environment.

High quality rendering system requires dynamic shadows cast by characters onto the environment and themselves. To manage shadow map resolution, the system implements Parallel Split Shadow Maps (see for example, Zhang, F., Sun, H., Xu, L., and Lun, L. K. 2006, Parallel-split shadow maps for large-scale virtual environments, in VRCIA '06: Proceedings of the 2006 ACM international conference on Virtual reality continuum and its applications, ACM, New York, N.Y., USA, pp. 311-318). The view-frustum test described above is used to ensure that only characters that are within a particular parallel split frustum are rendered. Occlusion culling could also be used for shadow maps as well, but need not be if only characters and smaller scene elements are rendered into the shadow maps and there may be little to cull the characters against (shadows cast by terrain are handled separately). Aggressive filtering is used for generation of soft shadows. This allows the use of further mesh simplification for the LOD rendered into shadow maps. For characters in the higher-detail shadow frusta, the same simplified geometry was used that is used for the most distant level of detail during normal rendering. For more distant shadows, a more extreme simplification can be used.

Figure 15:
FIG. 15 illustrates one example of a medium resolution spherical harmonic light map is used to light a highly detailed terrain: the fully shaded terrain, just the lighting from the spherical harmonic light map, a checkerboard pattern overlay to indicate light map texel density in accordance with an embodiment in the disclosure.

Lighting. FIG. 15 illustrates a medium resolution spherical harmonic light map that is used to light a highly detailed terrain: [left] the fully shaded terrain, [center] just the lighting from the spherical harmonic light map, [right] a checkerboard pattern overlay to indicate light map texel density.

In this section the lighting system used in the AMD Froblins demo is described. The demo does not have a dynamic day/night cycle, the global scene lighting is static which enables the use of a light map to store precomputed incident lighting on the terrain. A Spherical Harmonic Light Map (SHLM) (see for example, Chen, H. 2008, Lighting and Material of HALO 3. Game Developer's Conference, San Francisco) was used. A single texel in an SHLM stores a complete lighting environment at that point. At run time, the SHLM is queried and the lighting environment is evaluated in the direction of the shading normal, for example, to compute a diffuse lighting term. Because the shading normal is decoupled from the light map, a SHLM can be stored at a lower resolution than the finest level of shading detail while still providing detailed lighting results (FIG. 15). This decoupling also enables us to use the terrain's static light map like a radiance cache for computing lighting on scene elements such as the dynamic characters and props. Below is discussed a method for generating the SHLM as well as how this data was used for lighting. Finally, a simple technique for integrating dynamic shadows, cast by the characters, into the static scene while avoiding "double shadowing" artifacts in regions where dynamic character shadows overlap static terrain shadows is described.

Figure 16:
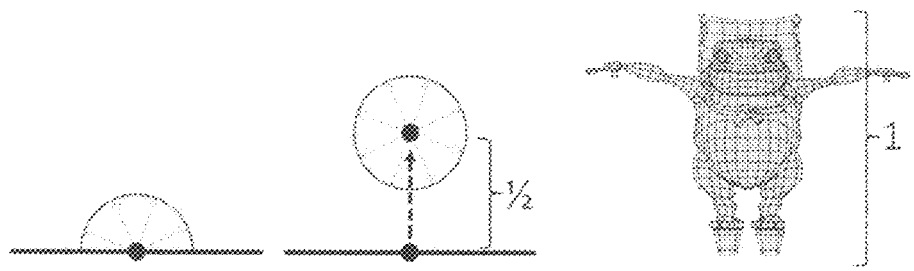
FIG. 16 illustrates one example of the lighting environment captured at a point by firing rays into the environment. in accordance with an embodiment in the disclosure.

SHLM Generation. The outdoor scene is comprised of two main global light emitters. The primary emitter is the sun which is modeled as a directional light source. The secondary emitter is the sky itself which is modeled using a high dynamic range environment map. To generate the SHLM, the terrain is divided uniformly into a grid that matches the desired light map resolution of 1024×1024. At the center of each grid square, lighting samples are taken at a point just above the terrain. Samples are taken at a distance off the terrain of approximately half of the character's height, as shown in FIG. 16. This height was chosen to ensure that the samples would work well for lighting both the terrain as well as the characters. Samples taken on the ground only capture a partial lighting environment and are poorly suited for shading points above the terrain that may require the missing lower hemisphere of the lighting environment. On the other hand, samples taken too far off the ground can create artifacts when used for shading the terrain. In particular, this can lead to missing or unnatural terrain shadow boundaries as well as incorrect self-reflectance. In practice, it was found that taking samples at a moderate height above the terrain the system was able to capture complete lighting environments that were useful for shading both the terrain and the characters.

FIG. 16 illustrates that the lighting environment is captured at a point by firing rays into the environment. [Left] A sample taken on the terrain surface does not contain useful lighting data in the lower hemisphere and is not suitable for shading characters that may have shading normals that point down into the lower hemisphere of the lighting environment. [Center] A sample point is offset from the terrain at a distance of approximately half of the characters' height, ensuring the captured lighting environment is useful for shading characters as well as the terrain itself. [Right] A character requires a full spherical lighting environment that captures bounced lighting from the ground below.

At each sample point, direct and indirect light is captured and projected into spherical harmonics. The direct light from the sun is computed by casting a distribution of rays in the direction of the sun and testing for occlusion. Indirect light from the sun and from the sky is collected by firing 800 rays, with a modest recursion limit, in all directions on the sphere, using a stratified sampling scheme. The incident radiance is then stored using $3^{rd}$ order spherical harmonics. This data is written to disk as 16-bit floating point textures using the OpenEXR image file format.

Rendering Using SHLM. For rendering, the $3^{rd}$ order spectral SHLM data is packed into seven RGBA16F textures. Others have suggested using various compression schemes (see for example, Wang, L., Wang, X., Sloan, P., Wei, L., Tong, X., and Guo, B. 2007, Rendering from Compressed High Dynamic Range Textures on Programmable Graphics Hardware. ACM Symposium on Interactive 3D Graphics and Games and Hu, Y. 2008, Lightmap Compression in HALO 3, Game Developer's Conference, San Francisco) but the memory budget did not require the system to compress the data and it was found that the uncompressed coefficients gave slightly higher quality lighting results particularly in areas of high contrast such as shadow boundaries. In these scenarios it was found that the system could get higher quality lighting results by storing a lower resolution uncompressed SHLM rather than a higher resolution compressed SHLM. It was observed that the DC components of the SHLM could be stored using a shared exponent texture format (RGBE) with minimal loss in quality; higher order spherical harmonic coefficients cannot be stored in this way because the format does not allow for negative values.

Final lighting is computed in a pixel shader by sampling the SHLM, removing the dominant directional light from the linear terms, then summing the contribution of this dominant directional light and the "residual" environment lighting (see for example, Sloan, P. 2008, Stupid Spherical Harmonic (SH) Tricks, Game Developer's Conference, San Francisco). DirectX® HLSL shader code demonstrating this is provided in the listing at the end of this section.

Figure 17:
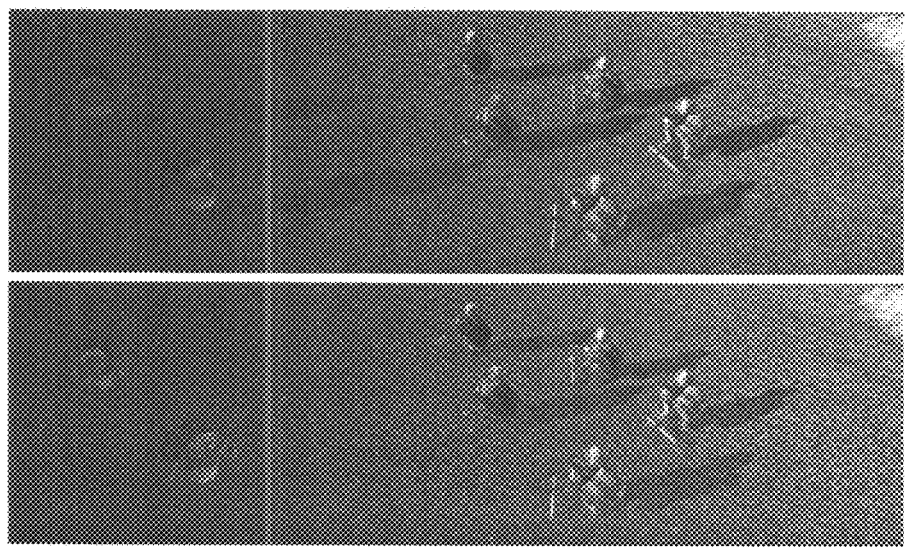
FIG. 17 illustrates one example of a shadow correction factor applied to prevent double shadowing artifacts in accordance with an embodiment in the disclosure.

Since the characters are dynamic, their shadows cannot be baked in to the SHLM as a preprocess. Instead, a more traditional real-time shadowing method, parallel-spit shadow mapping (see for example, Zhang, F., Sun, H., Xu, L., and Lun, L. K. 2006, Parallel-split shadow maps for large-scale virtual environments, in VRCIA '06: Proceedings of the 2006 ACM international conference on Virtual reality continuum and its applications, ACM, New York, N.Y., USA, pp. 311-318), was used to render their shadows. Simply darkening the terrain wherever a character casts a shadow is not desirable, this would incur a double shadowing artifact in regions that are already shadowed in the light map due to terrain self occlusion as shown in FIG. 17. Ideally the shadow map only attenuates the sun's contribution to the light map. This can be very nicely approximated by separating a dominant directional light from the lighting environment in the terrain's pixel shader. Please refer to Sloan, P. 2008, Stupid Spherical Harmonic (SH) Tricks, Game Developer's Conference (San Francisco) for a discussion on extracting a dominant light from a spherical harmonic lighting environment.

Once the dominant directional light is removed from the lighting environment sampled from the SHLM, the system tests if this light's direction corresponds with the sun's direction. If both vectors point in the same direction then the system determines that the pixel is in direct sun light and the shadow map should be applied. If the vectors disagree, then the pixel is considered to already be occluded from the sun and thus the effects of the shadow map are faded out. Once the adjusted shadowing term is computed, it is then used to attenuate the dominant lighting term which is then added to the remaining spherical harmonic lighting environment. Please see the sample code provided at the end of this section.

FIG. 17 illustrates that characters cast shadows on the terrain. The left half of the image is in the shadow of a mountain, the right half is in direct sun light. [Top] Characters incorrectly cast double shadows on occluded region of the terrain. [Bottom] A shadow correction factor is applied to prevent double shadowing artifacts.

Figure 18:
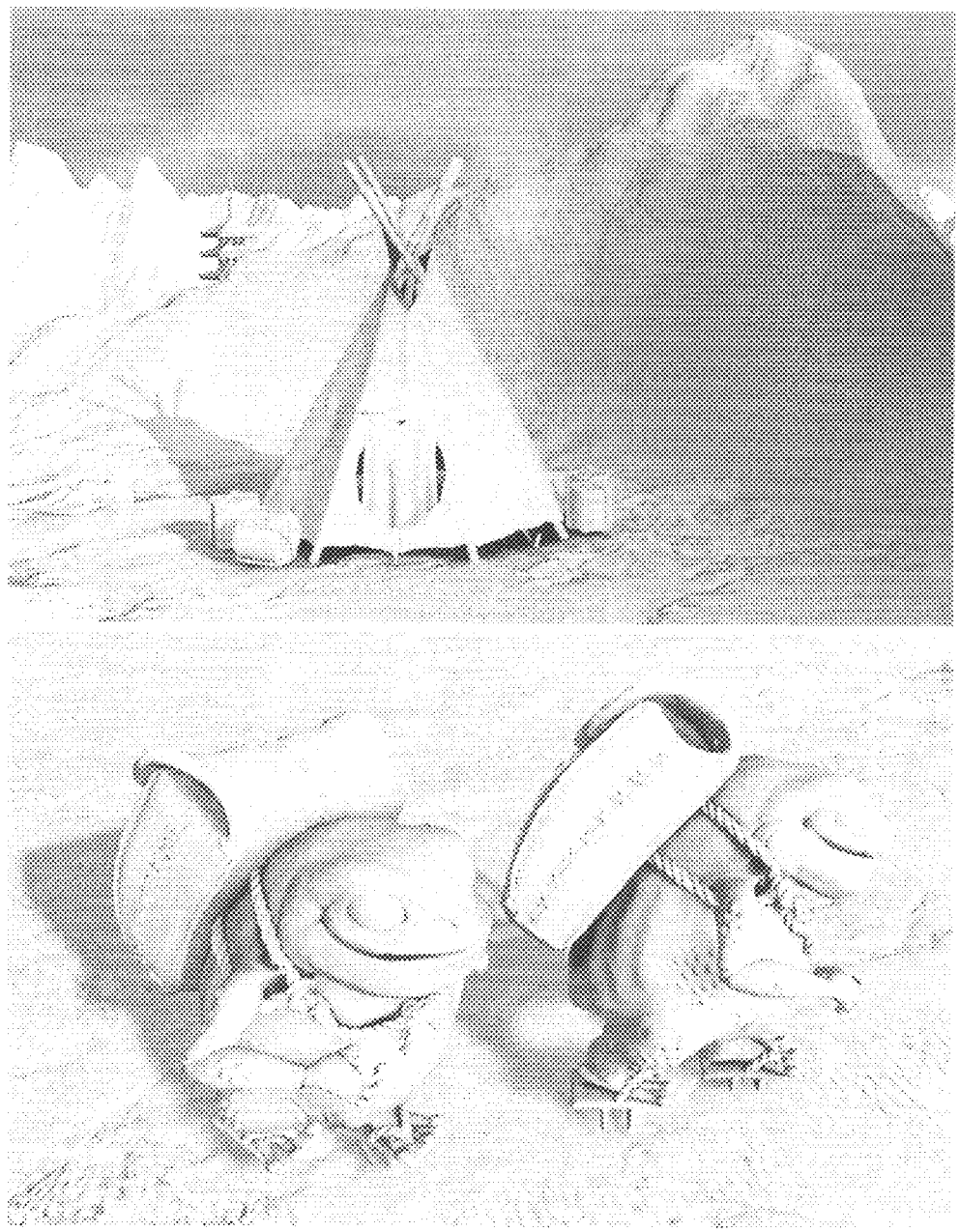
FIG. 18 illustrates one example of dynamic characters and other static scene props building an approximate lighting environment for shading by sampling from the terrain's SHLM in accordance with an embodiment in the disclosure.

The terrain's SHLM is used for lighting the characters and scene props (FIG. 18). In the characters' pixel shader, the point being shaded is projected onto the texture space of the SHLM and samples are taken which are then used to approximate a lighting environment for the character. This does not provide any lighting variation along the vertical axis but in practice it works quite well even for tall scene elements such as the tent in the figure's foreground or the pagoda in the figure's background. Additional texture maps could be used to store vertical gradients for the spherical harmonic coefficients; this would provide more accurate lighting environment reconstruction for points located above the terrain (see for example, Annen, T., Kautz, J., Durand, F., and Seidel, H.

P. 2004. Spherical Harmonic Gradients for Mid-Range Illumination. Rendering Techniques 2004: Eurographics Symposium on Rendering).

FIG. 18 illustrates dynamic characters (bottom) and other static scene props (top) build an approximate lighting environment for shading by sampling from the terrain's SHLM.

Listing 10. HLSL shader code implementing the spherical harmonic light map techniques described in this section.

```
// Samplers
sampler g sSHLMPoint;
sampler g_sSHLMBilinear;
sampler g_sSHLMTrilinear;
sampler g sSHLMAnisotropic;
// SHLM Textures
Texture2D<float4> tSHLM_R0;      // DC & linear (red)
Texture2D<float4> tSHLM_R1;      // first 4 quadratic (red)
Texture2D<float4> tSHLM_G0;      // DC & linear (green)
Texture2D<float4> tSHLM_G1;      // first 4 quadratic (green)
Texture2D<float4> tSHLM_B0;      // DC & linear (blue)
Texture2D<float4> tSHLM_B1;      // first 4 quadratic (blue)
Texture2D<float3> tSHLM RGB2;
// Global parameters, set by the application
float2 g_vSHLMEnvironmentScale;
float3 g vSHLMSunDirectionWS;
// ======================================================================
// Evaluate a SH basis functions for a given direction
// ======================================================================
void SHEvalDirection ( float3 vDirection, out float4 vOut[3] )
{
    float3 vDirection2 = vDirection * vDirection;
    vOut[0].x = 0.282095;
    vOut[0].y = -0.488603 * vDirection.y;
    vOut[0].z = 0.488603 * vDirection.z;
    vOut[0].w = -0.488603 * vDirection.x;
    vOut[1].x = 1.092548 * vDirection.x * vDirection.y;
    vOut[1].y = -1.092548 * vDirection.y * vDirection.z;
    vOut[1].z = 0.315392 * (3.0*vDirection2.z - 1.0);
    vOut[1].w = -1.092548 * vDirection.x * vDirection.z;
    vOut[2].x = 0.546274 * (vDirection2.x - vDirection2.y);
    // Last three channels go unused
    vOut[2].yzw = 0.0;
    return;
}
// ======================================================================
// Turn world space position into light map UV
// ======================================================================
float2 ComputeLightMapUV ( float3 vPositionWS )
{
    float2 vUV = (vPositionWS.xz / g_vSHLMEnvironmentScale) + 0.5;
    return vUV;
}
// ======================================================================
// Assemble the SH coefficients & Dominant light info. SH is 3rd order (9
// coefficients per color channel). Coefficients are stored in an array of
// float4 vectors, the last the components of the last float4 vector in each
// array go unused.
//
// Inputs:
// vUV - Texture coord
// sLightMapSampler - sampler state
//
// Outputs:
// vSHr[ ] - Residual lighting environment (dominant light removed)
// vSHg[ ] - Residual lighting environment (dominant light removed)
// vSHb[ ] - Residual lighting environment (dominant light removed)
// cDominantColor - Dominant directional light color
// vDominantDir - Dominant directional light direction
// ======================================================================
void GetLightingEnvironment ( float2 vUV, sampler sLightMapSampler,
                              out float4 vSHr[3], out float4 vSHg[3],
                              out float4 vSHb[3], out float3 cDominantColor,
                              out float3 vDominantDir )
{
    vSHr[0] = tSHLM R0.Sample(    sLightMapSampler, vUV ); // DC & linear terms
    vSHg[0] = tSHLM_G0.Sample(    sLightMapSampler, vUV ); // DC & linear terms
    vSHb[0] = tSHLM_B0.Sample(    sLightMapSampler, vUV ); // DC & linear terms
    vSHr[1] = tSHLM R1.Sample(    sLightMapSampler, vUV ); // first 4 quadratic
    vSHg[1] = tSHLM_G1.Sample(    sLightMapSampler, vUV ); // first 4 quadratic
    vSHb[1] = tSHLM_B1.Sample(    SLightMapSampler, vUV ); // first 4 quadratic
    // final quadratic (red, green, blue)
    float3 vTmp = tSHLM_RGB2.Sample( sLightMapSampler, vUV );
```

Listing 10. HLSL shader code implementing the spherical
harmonic light map techniques described in this section.

```
    vSHr[2].x = vTmp.r; // last 3 channels of vSHr[2] go unused
    vSHg[2].x = vTmp.g; // last 3 channels of vSHr[2] go unused
    vSHb[2].x = vTmp.b; // last 3 channels of vSHr[2] go unused
    // extract dominant light direction from linear SH terms
    vDominantDir = (vSHr[0].yzw * 0.3 + vSHg[0].yzw * 0.59 + vSHb[0].yzw*0.11);
    vDominantDir = normalize ( float3(-vDominantDir.zx, vDominantDir.y) );
    // turn dom direction into an SH directional light with unit intensity
    float4 Ld[3];
    SHEvalDirection( vDominantDir, Ld );
    Ld[0] *= 2.95679308573; // factor to make it unit intensity
    Ld[1] *= 2.95679308573;
    Ld[2] *= 2.95679308573;
    float fDenom = dot(Ld[0],Ld[0])+dot(Ld[1],Ld[1])+(Ld[2].x*Ld[2].x);
    // find the color of the dominant light
    cDominantColor.r =
        (dot(Ld[0],vSHr[0])+dot(Ld[1],vSHr[1])+(Ld[2].x*vSHr[2].x))/fDenom;
    cDominantColor.g =
        (dot(Ld[0],vSHg[0])+dot(Ld[1],vSHg[1])+(Ld[2].x*vSHg[2].x))/fDenom;
    cDominantColor.b =
        (dot(Ld[0] vSHb[0])+dot(Ld[1],vSHb[1])+(Ld[2].x*vSHb[2].x))/fDenom;
    // subtract dominant light from original lighting environment so we
    // don't get double lighting
    vSHr[0] = vSHr[0] - Ld[0]*cDominantColor.r;
    vSHg[0] = vSHg[0] - Ld[0]*cDominantColor.g;
    vSHb[0] = vSHb[0] - Ld[0]*cDominantColor.b;
    vSHr[1] = vSHr[1] - Ld[1]*cDominantColor.r;
    vSHg[1] = vSHg[1] - Ld[1]*cDominantColor.g;
    vSHb[1] = vSHb[1] - Ld[1]*cDominantColor.b;
    vSHr[2].x = vSHr[2].x - Ld[2].x*cDominantColor.r;
    vSHg[2].x = vSHg[2],x - Ld[2].x*cDominantColor.g;
    vSHb[2].x = vSHb[2].x - Ld[2].x*cDominantColor.b;
}
// ==========================================================================
// Compute the amount of shadow to apply. fShadow comes from a shadow
// map lookup.
// ==========================================================================
float ComputeDirectLightingShadowFactor ( float3 vDominantLightDir,
                                         float fShadow )
{
    // in order to avoid double darkening we figure out how much the dominant
    // light matches up with the actual directional light source and then use
    // that to figure out how much extra darkening we should apply.
    // thresholds for fading in shadow. the cosine of the angle between the
    // two vectors is mapped to the [0,1] range. these thresholds mark the
    // points within that threshold that the shadow is faded in. Tweak these
    // to change the range over which the shadow is faded in/out.
    static const float fShadowStart = 0.45; // start fading at ~63 degrees
    static const float fshadowStop = 0.95; // full shadow at ~18 degrees
    // smoothstep to fade in/out shadow. Dot product is scaled/biased
    // from [-1,1] into [0,1] range. threshold terms determine where
    // the fade in/out boundaries are. we call this "exposure to sun"
    // because it approximates how exposed you are to the sun and
    // thus how much shadow should be allowed.
    float fAngle = dot(vDominantLightDir,g vSHLMSunDirectionWS)*0.5+0.5;
    float fExposureToSun = smoothstep(fShadowStartThreshold,
                                      fShadowStopThreshold,
                                      fAngle);
    // amount of dominant light to remove
    float fPercentShadowed = lerp( 1, fShadow, fExposureToSun);
    return fPercentShadowed;
}
// ==========================================================================
// Compute shadowed diffuse lighting. We pass the dominant light direction
// and dominant light color back to the caller so that it may be used for
// specular/glossy calculations. The adjusted shadow factor is passed back
// in the alpha channel of the returned vector so that it may be used for
// shadowing any specular/glossy shading terms that the caller computes.
// ==========================================================================
float4 ComputeDiffuse ( float3 vPositionWS, float3 vNormalWS, float fShadow,
                        out float3 vDominantLightDir,
                        out float3 cDominantLightColor )
{
    // compute a texture coord for the light map
    float2 vUV = ComputeLightMapUV( vPositionWS );
    // get the lighting environment
    float4 vSHLightingEnvR[3], vSHLightingEnvG[3], vSHLightingEnvB[3];
```

Listing 10. HLSL shader code implementing the spherical
harmonic light map techniques described in this section.

```
GetLightingEnvironment( vUV, g sSHLMBilinear,
                        vSHLightingEnvR, vSHLightingEnvG, vSHLightingEnvB,
                        cDominantLightColor, vDominantLightDir );
// build basis for lambertian reflectance function
float4 vSHLambert[3];
SHEvalDirection( vNormalWS, vSHLambert );
// the lambertian SH convolution coefficients for the first three bands
float3 vConvolution = float3( 1.0, 2.0/3.0, 1.0/4.0 );
vSHLambert[0] *= vConvolution.xyyy;
vSHLambert[1] *= vConvolution.zzzz;
vSHLambert[2].x *= vConvolution.z;
// apply shadow to the direct dominant light
float fShadowFactor =
    ComputeDirectLightingShadowFactor( vDominantLightDir, fShadow );
cDominantLightColor *= fShadowFactor;
// direct diffuse lighting (from dominant directional light)
float3 cDiffuse =
    max( 0, dot(vNormalWS, vDominantLightDir) ) * cDominantLightColor;
// diffuse light from lighting environment (dominant light removed)
cDiffuse.r += dot( vSHLambert[0], vSHLightingEnvR[0] ); // DC & linear
cDiffuse.g += dot( vSHLambert[0], vSHLightingEnvG[0] );
cDiffuse.b += dot( vSHLambert[0], vSHLightingEnvB[0] );
cDiffuse.r += dot( vSHLambert[1], vSHLightingEnvR[1] ); // quadractic
cDiffuse.g += dot( vSHLambert[1], vSHLightingEnvG[1] );
cDiffuse.b += dot( vSHLambert[1], vSHLightingEnvB[1] );
cDiffuse.r += vSHLambert[2].x * vSHLightingEnvR[2].x;
cDiffuse.g += vSHLambert[2].x * vSHLightingEnvG[2].x;
cDiffuse.b += vSHLambert[2].x * vSHLightingEnvB[2].x;
cDiffuse = max( 0, cDiffuse );
return float4(cDiffuse, fShadowFactor);
}
```

Described above are methods for computing dynamic path finding, using global model and local avoidance for handling character-to-character collisions. In a large-scale environment with thousands of highly detailed, intelligent characters, the Froblins (frog goblins), are concurrently simulated, animated and rendered entirely on the GPU. The Froblins demo contains 3000 characters, rendering at various levels of details, ranging from coarsest level at only 900 polygons all the way to over 1.6M triangles at extreme close-ups. Thousands of animated intelligent characters can be rendered from a variety of viewpoints ranging from extreme close-ups to far away "bird's eye" views of the entire system. The system combines state-of-the-art parallel artificial intelligence computation for dynamic pathfinding and local avoidance on the GPU, massive crowd rendering with LOD management with high end rendering capabilities such as tessellation for high quality close-ups and stable performance, terrain system, cascaded shadows for large-range environments, and an advanced global illumination system. Interactive rendering rates (over 20 fps on ATI Radeon® HD 4870) may be provided with staggering polygon count (6-8 million triangles on average at 20-25 fps), while maintaining the full high quality lighting and shadowing solution.

See http://developer.amd.com/gpu/MeshMapper/Pages/default.aspx.

See van den Berg, J., Patil, S., Sewall, J., Manocha, D., and Lin, M. 2008. Interactive Navigation of Multiple Agents in Crowded Environments. In Proceedings of the 2008 Symposium on interactive 3D Graphics and Games (Redwood City, Calif., Feb. 15-17, 2008). SI3D '08. ACM, New York, N.Y., 139-147.

APPENDIX A

Listing 11. HLSL code for iterative eikonal solver

```
// Solve for roots of quadratic equation
float2 EvalQuadratic( float a, float b, float c )
{
    float2 roots;
    roots.x = (-b + sqrt( b*b-4*a*c ))/(2*a);
    roots.y = (-b - sqrt( b*b-4*a*c ))/(2*a);
    if( b*b <= 4*a*c )
    {
        roots = float2( INF-1, INF-1);
    }
    return roots;
}
// Solve for the the potential of the current position based on the
// potential of the neighbors and the cost of moving here from there. Refer
// to Jeong "A Fast Eikonal Equation Solver for Parallel Systems" 2007.
float QuadraticSolver( float fPhiMx, float fPhiMy,
```

APPENDIX A-continued

Listing 11. HLSL code for iterative eikonal solver

```
                      float fCostMx, float fCostMy )
{
    float a = fPhiMx;
    float b = fPhiMy;
    float c = fCostMx;
    float d = fCostMy;
    float a1 = c * c + d * d;
    float b1 = -(2 * a * d * d + 2 * b * c * c);
    float c1 = a * a * d * d + b * b * c * c - c * c * d * d;
    float2 roots = EvalQuadratic( a1, b1, c1 );
    float fTmp = max( roots.x, roots.y );
    return fTmp;
}
float EvaluateFiniteDifference( float fPhi, float fCost,
                                float4 vPhi, float4 vCost )
{
    float fPhiX, fPhiY, fCostX, fCostY;
    float fPhiN = vPhi[0], fPhiS = vPhi[1], fPhiW = vPhi[2],
          fPhiE = vPhi [3];
    float fCostN = vCost[0], fCostS = vCost[1], fCostW = vCost[2],
          fCostE = vCost[3] ;
    //====Calculate upwind direction for X====
    if( fPhiW < INF || fPhiE < INF )
    {
        // Figure out if west or east are "cheaper"
        if( fPhiW + fCostW <= fPhiE + fCostE )
        {
            fPhiX = fPhiW;
            fCostX = fCostW;
        }
        else
        {
            fPhiX = fPhiE;
            fCostX = fCOBtE;
        }
    }
        //====Calculate upwind direction for Y====
        if( fPhiN < INF || fPhiS < INF )
        {
            bInvalidY = false;
            // Figure out if north or south are "cheaper"
            if( fPhiN + fCostN <= fPhiS + fCostS )
            {
                fPhiY = fPhiN;
                fCostY = fCostN;
            }
            else
            {
                fPhiY = fPhiS;
                fCostY = fCostS;
            }
        }
        //Save for new potential in this location by solving guadratic
        float result = 0;
        result = QuadraticSolver( fPhiX, fPhiY, fCostX, fCostY );
        result = min( min( fPhiY + fCostY, fPhiX + fCostX ); result );
        // Potential should only be decreasing
        result = ( result > fPhi ) ? fPhi : result;
    }
float4 EikonalSolverIteration( )
{
    float4 vCurPhi = tPhiMap.SampleLevel( sPhiPoint, v.vUV, 0 );
    float4 vCurCost = tCostMap.SampleLevel( sCostPoint, v.vuv, 0 );
    // Fetch potential values. Fetches out of domain = INF
    float4 vPhiN = tPhiMap.SampleLevel( sPhiPoint, v.vUV, 0, int2( 0,-1 ) );
    float4 vPhiS = tPhiMap.SampleLevel( sPhiPoint, v.vUV, 0, int2( 0, 1 ) );
    float4 vPhiW = tPhiMap.SampleLevel( sPhiPoint, v.vUV, 0, int2(-1, 0 ) );
    float4 vPhiE = tPhiMap.SampleLevel( sPhiPoint, v.vUV, 0, int2( 1, 0 ) );
    // Fetch potential values. Fetches out of domain = 10000
    float4 vCostN = tCostMap.SampleLevel( sCostPoint, v.vUV, 0, int2( 0,-1 );
    float4 vCostS = tCostMap.SampleLevel( sCostPoint, v.vUV, 0, int2( 0, 1 );
    float4 vCostW = tCostMap.SampleLevel( sCostPoint, v.vUV, 0, int2(-1, 0 );
    float4 vCostE = tCostMap.SampleLevel( sCostPoint, v.vUV, 0, int2( 1, 0 );
    float4 vPhi;
    [unroll]
    for( int i = 0; i < 4; i++ )
    {
```

APPENDIX A-continued

Listing 11. HLSL code for iterative eikonal solver

```
        vPhi [i] = EvaluateFiniteDifference( vCurPhi[i], vCurCost[i],
                float4( vPhiN[i], vPhiS[i], vPhiW[i], vPhiE[i] ),
                float4( vCostN[i], vCostS[i], vCostW[i], vCostE[i] ) );
    }
    return vPhi;
}
```

Also, integrated circuit design systems (e.g. work stations) are known that create integrated circuits based on executable instructions stored on a computer readable memory such as but not limited to CDROM, RAM, other forms of ROM, hard drives, distributed memory etc. The instructions may be represented by any suitable language such as but not limited to hardware descriptor language or other suitable language. As such, the GPUs (e.g., circuits) described herein may also be produced as integrated circuits by such systems. For example an integrated circuit may be created for use in a display system using instructions stored on a computer readable medium that when executed cause the integrated circuit design system to create an integrated circuit that is operative to perform the operations described herein. Integrated circuits having the logic that performs other of the operations described herein may also be suitably produced.

The above detailed description of the embodiments and the examples described therein have been presented for the purposes of illustration and description only and not by limitation. It is therefore contemplated that the present embodiments cover any and all modifications, variations or equivalents that fall within the spirit and scope of the basic underlying principles disclosed above and claimed herein.

What is claimed is:

1. A method carried out by graphics processing circuitry comprising:
computing a bin address for a plurality of item identifiers, said bin address corresponding to a texel space partition of a two-dimensional grid of bins, wherein each bin has a corresponding bin address, wherein said item identifiers are assigned unique item identifiers, assigned to a plurality of graphical image items to create said plurality of item identifiers, wherein said item identifiers are buffered as a depth texture array, said depth texture array sent to said graphics processing circuitry as a buffer of point primitives;
determining that an item identifier, of said plurality of item identifiers, is different than a previous item identifier placed at a bin address;
streaming out said item identifier to a new working set;
determining, that an item identifier, of said plurality of item identifiers, is identical to a previous item identifier placed at a bin address; and
marking said item identifier for deletion.

2. Graphics processing circuitry comprising:
programmable shader logic operative to execute programmable instructions that when executed cause the programmable shader logic to compute a bin address for a plurality of item identifiers, said bin address corresponding to a texel space partition of a two-dimensional grid of bins, wherein each bin has a corresponding bin address, wherein said item identifiers are assigned unique item identifiers, assigned to a plurality of graphical image items to create said plurality of item identifiers, wherein said item identifiers are buffered as a depth texture array, said depth texture array sent to said graphics processing circuitry as a buffer of point primitives;
determine by said programmable shader logic that an item identifier, of said plurality of item identifiers, is different than a previous item identifier placed at a bin address;
streaming out said item identifier to a new working set;
wherein said graphics processing circuitry is further operative to:
determine, that an item identifier, of said plurality of item identifiers, s identical to a previous item identifier placed at a bin address; and
mark said item identifier for deletion.

3. A method carried out by graphics processing circuitry comprising:
computing a bin address for a plurality of item identifiers, said bin address corresponding to a texel space partition of a two-dimensional grid of bins, wherein each bin has a corresponding bin address, wherein said item identifiers are assigned unique item identifiers, assigned to a plurality of graphical image items to create said plurality of item identifiers, wherein said item identifiers are buffered as a depth texture array, said depth texture array sent to said graphics processing circuitry as a buffer of point primitives;
determining that an item identifier, of said plurality of item identifiers, is different than a previous item identifier placed at a bin address;
streaming out said item identifier to a new working set;
selecting an item identifier for a bin address wherein said item identifier corresponds to a lowest depth value; and
associating said item identifier to said bin address.

4. A method carried out by graphics processing circuitry comprising:
computing a bin address for a plurality of item identifiers, said bin address corresponding to a texel space partition of a two-dimensional grid of bins, wherein each bin has a corresponding bin address, wherein said item identifiers are assigned unique item identifiers, assigned to a plurality of graphical image items to create said plurality of item identifiers, wherein said item identifiers are buffered as a depth texture array, said depth texture array sent to said graphics processing circuitry as a buffer of point primitives;
determining that an item identifier, of said plurality of item identifiers, is different than a previous item identifier placed at a bin address;
streaming out said item identifier to a new working set; and
writing, a pass number to a bin counter contained in a color buffer.

5. A method carried out by graphics processing circuitry comprising:
computing a bin address for a plurality of item identifiers, said bin address corresponding to a texel space partition of a two-dimensional grid of bins, wherein each bin has a corresponding bin address, wherein said item identifiers are assigned unique item identifiers, assigned to a plurality of graphical image items to create said plurality of item identifiers, wherein said item identifiers are buffered as a depth texture array, said depth texture array sent to said graphics processing circuitry as a buffer of point primitives;

determining that an item identifier, of said plurality of item identifiers, is different than a previous item identifier placed at a bin address;

streaming out said item identifier to a new working set;

writing, a pass number to a bin counter contained in a color buffer;

defining said plurality of item identifiers as a working set;

determining that said working set is not empty after writing said pass number; and binding said working set to said depth texture array and sending to said graphics processing circuitry.

6. Graphics processing circuitry comprising:

programmable shader logic operative to execute programmable instructions that when executed cause the programmable shader logic to compute a bin address for a plurality of item identifiers, said bin address corresponding to a texel space partition of a two-dimensional grid of bins, wherein each bin has a corresponding bin address, wherein said item identifiers are assigned unique item identifiers, assigned to a plurality of graphical image items to create said plurality of item identifiers, wherein said item identifiers are buffered as a depth texture array, said depth texture array sent to said graphics processing circuitry as a buffer of point primitives;

determine by said programmable shader logic that an item identifier, of said plurality of item identifiers, is different than a previous item identifier placed at a bin address;

streaming out said item identifier to a new working set;

wherein said graphics processing circuitry is further operative to:
 select an item identifier for a bin address wherein said item identifier corresponds to a lowest depth value; and
 associate said item identifier to said bin address.

7. Graphics processing circuitry comprising:

programmable shader logic operative to execute programmable instructions that when executed cause the programmable shader logic to compute a bin address for a plurality of item identifiers, said bin address corresponding to a texel space partition of a two-dimensional grid of bins, wherein each bin has a corresponding bin address, wherein said item identifiers are assigned unique item identifiers, assigned to a plurality of graphical image items to create said plurality of item identifiers, wherein said item identifiers are buffered as a depth texture array, said depth texture array sent to said graphics processing circuitry as a buffer of point primitives;

determine by said programmable shader logic that an item identifier, of said plurality of item identifiers, is different than a previous item identifier placed at a bin address;

streaming out said item identifier to a new working set;

wherein said graphics processing circuitry is further operative to:
 write a pass number to a bin counter contained in a color buffer.

8. Graphics processing circuitry comprising:

programmable shader logic operative to execute programmable instructions that when executed cause the programmable shader logic to compute a bin address for a plurality of item identifiers, said bin address corresponding to a texel space partition of a two-dimensional grid of bins, wherein each bin has a corresponding bin address, wherein said item identifiers are assigned unique item identifiers, assigned to a plurality of graphical image items to create said plurality of item identifiers, wherein said item identifiers are buffered as a depth texture array, said depth texture array sent to said graphics processing circuitry as a buffer of point primitives;

determine by said programmable shader logic that an item identifier, of said plurality of item identifiers, is different than a previous item identifier placed at a bin address;

streaming out said item identifier to a new working set;

wherein said graphics processing circuitry is further operative to:
 write a pass number to a bin counter contained in a color buffer;
 define said plurality of item identifiers as a working set;
 determine that said working set is not empty after writing said pass number; and
 bind said working set to said depth texture array and sending to said graphics processing circuitry.

* * * * *